US009325101B2

(12) United States Patent
Tsutsumi et al.

(10) Patent No.: US 9,325,101 B2
(45) Date of Patent: Apr. 26, 2016

(54) ADAPTER FOR A RECORDING MEDIUM

(71) Applicant: Sony Corporation, Tokyo (JP)

(72) Inventors: Isao Tsutsumi, Kanagawa (JP); Shinji Takaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/327,397

(22) Filed: Jul. 9, 2014

(65) Prior Publication Data

US 2015/0024623 A1    Jan. 22, 2015

(30) Foreign Application Priority Data

Jul. 16, 2013  (JP) .................................. 2013-147372

(51) Int. Cl.
| | |
|---|---|
| *H01R 4/28* | (2006.01) |
| *H01R 13/46* | (2006.01) |
| *H01R 33/90* | (2006.01) |
| *G06K 7/04* | (2006.01) |
| *H04N 5/225* | (2006.01) |
| *G11B 23/03* | (2006.01) |
| *G11B 33/12* | (2006.01) |

(52) U.S. Cl.
CPC ......... *H01R 13/46* (2013.01); *G06K 7/04* (2013.01); *G11B 23/0317* (2013.01); *G11B 33/124* (2013.01); *H01R 33/90* (2013.01); *H04N 5/2251* (2013.01)

(58) Field of Classification Search
CPC ...... H01R 13/46; H01R 33/90; G11B 33/124; G11B 23/0317; G06K 7/04; H04N 5/2251
USPC ........................ 439/485, 628, 487, 124, 638
See application file for complete search history.

(56) References Cited

U.S. PATENT DOCUMENTS 8,670,231 B2 *   3/2014   Tanaka et al. ............ 361/679.46

FOREIGN PATENT DOCUMENTS

JP        2012-203423 A     10/2012

* cited by examiner

*Primary Examiner* — Javaid Nasri
(74) *Attorney, Agent, or Firm* — Sheridan Ross P.C.

(57) ABSTRACT

An adapter device includes a cover that covers an inserted recording medium, a cover urging portion that urges the cover in a direction of the recording medium and causes the cover to be in press contact with the recording medium, and a connector conversion section that connects a terminal portion of the recording medium to a connector on an apparatus side having a different physical specification.

11 Claims, 23 Drawing Sheets

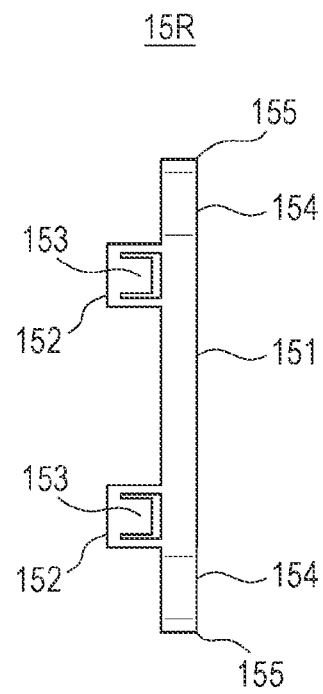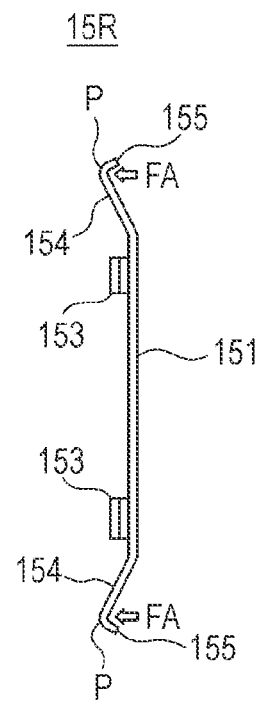

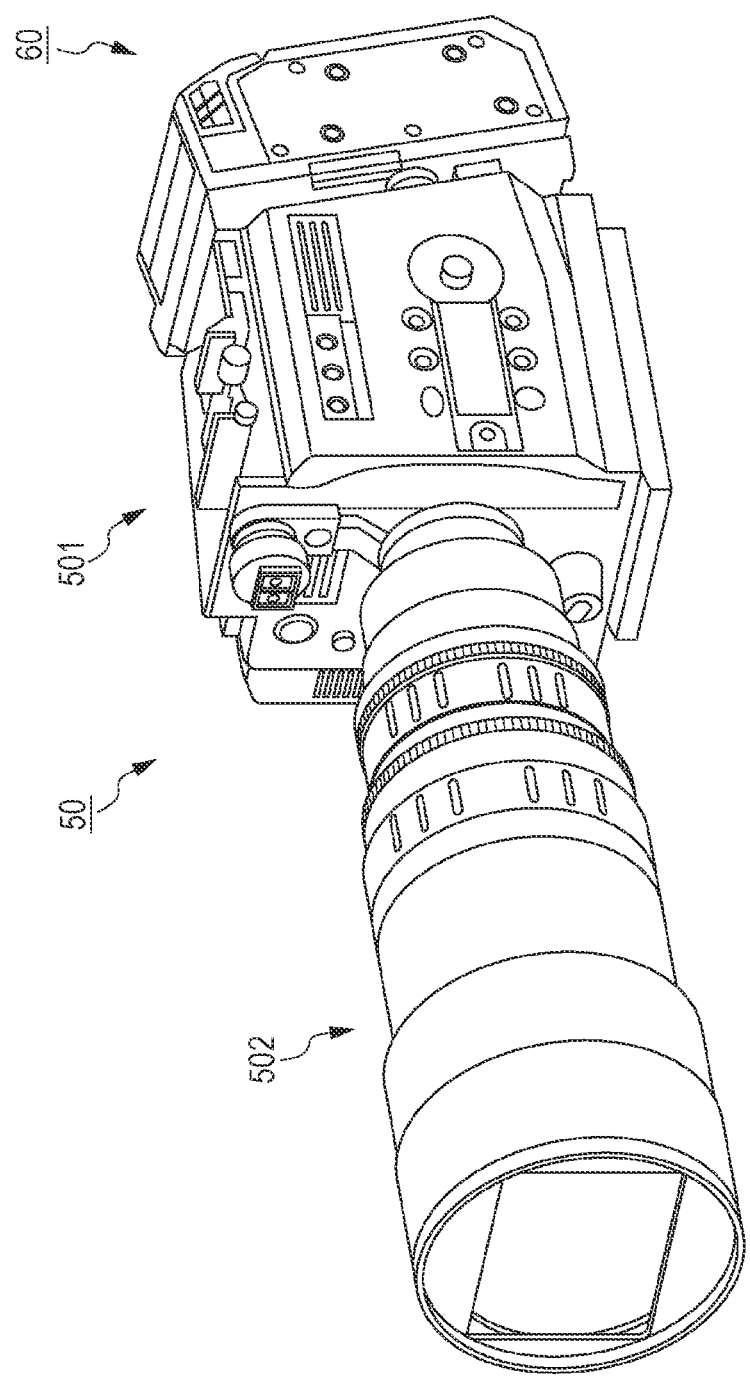

60

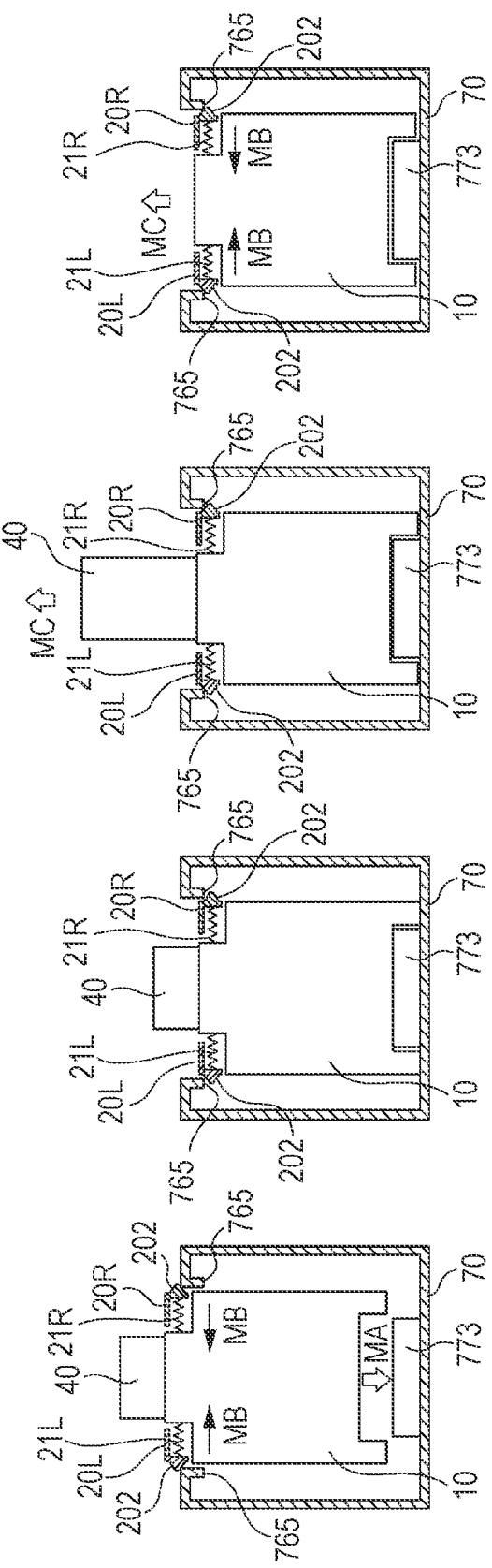

ADAPTER FOR A RECORDING MEDIUM

CROSS REFERENCE TO RELATED APPLICATIONS

This application claims the benefit of Japanese Priority Patent Application JP 2013-147372 filed Jul. 16, 2013, the entire contents of which are incorporated herein by reference.

BACKGROUND

The present technology relates to an adapter device and an electronic apparatus which are suitable to be used in a recording medium having a different physical specification.

In the related art, in electronic apparatuses, recording and reproducing of various types of data have been performed using a card-shaped recording medium, for example, a media card in which a semiconductor element such as flash memory and the like are used. When the card-shaped recording medium is used in an the electronic apparatus, in Japanese Unexamined Patent Application Publication No. 2012-203423, a movement of a heat sink is performed to be synchronized with an opening-closing operation of a gateway of the recording medium caused by an opening-closing lid. In other words, when the opening-closing lid is opened, the heat sink moves in a direction to be away from a recording medium accommodation section, and when the opening-closing lid is closed, the heat sink moves in a direction to be close to the recording medium accommodation section, thereby being in press contact with the recording medium in the recording medium accommodation section. As a result, heat generated in the recording medium can be radiated to the outside through the heat sink. When inserting and withdrawing the recording medium, the recording medium is unlikely to rub against the heat sink, and thus, it is possible to prevent damage and the like to the recording medium.

SUMMARY

Incidentally, when there is provided a recording medium having a physical specification different from that of a card-shaped recording medium, and when using the recording medium having a physical specification different from a recording medium to be inserted into a recording medium accommodation section of an electronic apparatus, it is necessary to have an adapter device.

Therefore, according to the present technology, it is desirable to provide an adapter device and an electronic apparatus which are suitable to be used in the recording medium having a different physical specification.

According to a first embodiment of the present technology, there is provided an adapter device including a cover that covers an inserted recording medium, a cover urging portion that urges the cover in a direction of the recording medium and causes the cover to be in press contact with the recording medium, and a connector conversion section that connects a terminal portion of the recording medium to a connector on an apparatus side having a different physical specification.

In the adapter device according to the present technology, there is provided the connector conversion section through which a recording medium can be connected to the connector on the apparatus side having a different physical specification. The adapter device is configured to cause the cover to be in press contact with the recording medium which is inserted to be connected to the connector conversion section. For example, the cover includes a first cover which covers one surface of the recording medium and a second cover which covers the other surface of the recording medium opposing the one surface. The first cover and the second cover are urged by the cover urging portion in a direction in order to pinch the recording medium which is inserted between the covers. An insertion guide is provided in a recording medium insertion side end portion of the cover, and a cover surface of the insertion guide protrudes in a direction opposite to the recording medium side. A sheet-shaped protection member is provided on a surface of the cover on the recording medium side. Positions of the first cover and the second cover are switched with respect to an insertion position of the recording medium in an installation position of the cover urging portion. The cover urging portion urges the first cover and the second cover in a direction of the recording medium by urging the first cover and the second cover to widen the gap therebetween. A regulation portion that regulates a movement of the cover in a direction opposite to an urging direction within a predetermined amount is provided in the cover urging portion. The connector conversion section is provided to be movable in a direction vertical to front and rear surfaces of the recording medium. An engagement portion that is urged to protrude is provided in a side end of the adapter device. An evulsion force during a withdrawal of the adapter device from the electronic apparatus against an urging force of the engagement portion is set to be greater than the evulsion force during a withdrawal of the inserted recording medium.

According to a second embodiment of the present technology, there is provided an electronic apparatus including an adapter unit and a heat sink that radiates heat generated in the adapter unit to the outside. The adapter unit has a cover that covers an inserted recording medium, a cover urging portion that urges the cover in a direction of the recording medium and causes the cover to be in press contact with the recording medium, and a connector conversion section that connects the terminal portion of the recording medium to the connector on the apparatus side having a different physical specification.

According to the present technology, an adapter device is provided with a cover that covers an inserted recording medium, a cover urging portion that urges the cover in a direction of the recording medium and causes the cover to be in press contact with the recording medium, and a connector conversion section that connects a terminal portion of the recording medium to a connector on an apparatus side having a different physical specification. Therefore, for example, heat generated in the recording medium which is inserted in the adapter device can be efficiently transmitted to the cover, and thus, it is possible to provide an adapter device and an electronic apparatus which are suitable to be used in the recording medium having a different physical specification. The effect disclosed in the present specification is merely an example not meant to be limited, and there may be an additional effect hereto.

BRIEF DESCRIPTION OF THE DRAWINGS

FIGS. 6A and 6B are views illustrating a cover urging portion;

FIG. 16 is a perspective view exemplifying an appearance of a video camera for professional purposes;

FIGS. 26A to 26D are views illustrating schematized operations of insertion and withdrawal of the adapter device.

DETAILED DESCRIPTION OF EMBODIMENTS

Hereinafter, embodiments of the present technology will be described, and the description will be given in the following order.

1. Configuration of Adapter Device
2. Insertion and Withdrawal Operations of Recording Medium with respect to Adapter Device
3. Another Operation of Adapter Device
4. Electronic Apparatus Using Adapter Device
5. Another Electronic Apparatus Using Adapter Device 1. Configuration of Adapter Device 1-1. Example of Appearance of Adapter Device An adapter device has a cover that covers an inserted recording medium, a cover urging portion that urges the cover in a direction of the recording medium and causes the cover to be in press contact with the recording medium, and a connector conversion section that connects a terminal portion of the recording medium to a connector on an apparatus side having a different physical specification.

Figure 1:
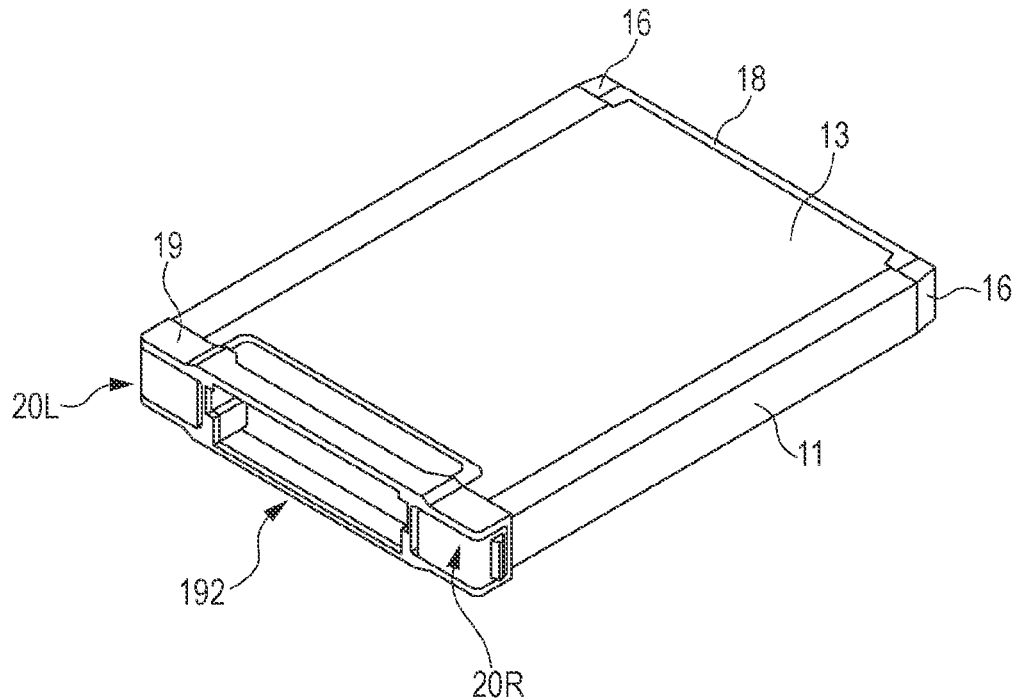
FIG. 1 is a perspective view exemplifying an appearance of an adapter device from a front side.
Figure 2:
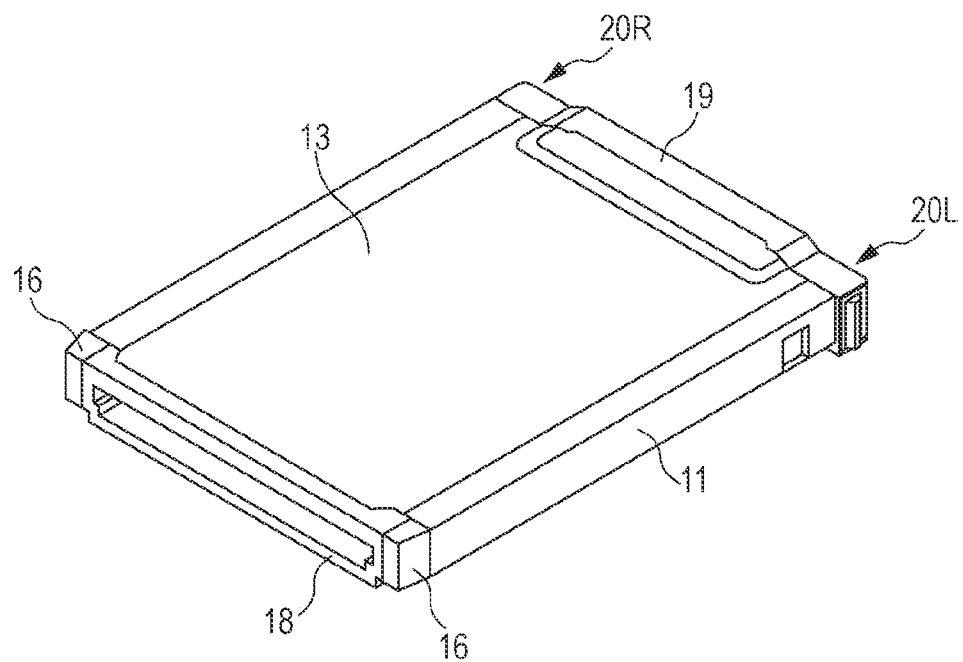
FIG. 2 is a perspective view exemplifying an appearance of the adapter device from a rear side.
Figure 3:
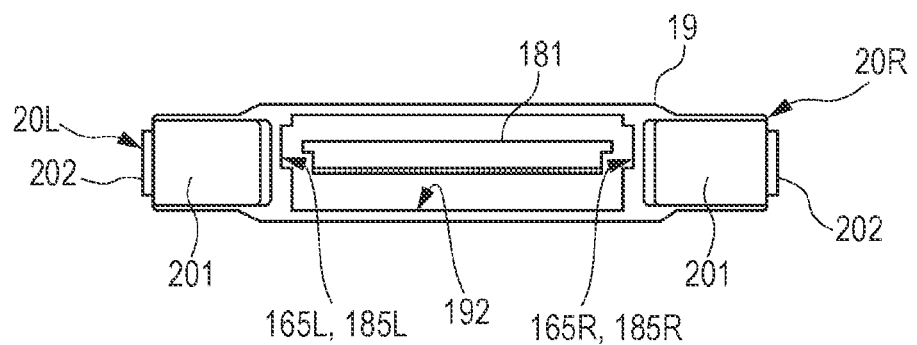
FIG. 3 is a front view of the adapter device.
Figure 4:
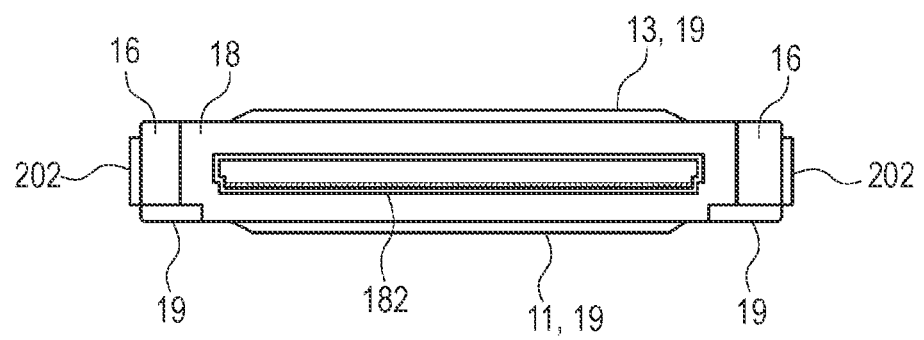
FIG. 4 is a rear view of the adapter device.

FIGS. 1 and 2 are perspective views exemplifying appearances of the adapter device. If a card-shaped recording medium insertion side is regarded as a front of an adapter device 10, FIG. 1 is a perspective view seen from a front side, and FIG. 2 is a perspective view seen from a rear side. FIG. 3 exemplifies a front view of the adapter device 10, and FIG. 4 exemplifies a rear view of the adapter device 10.

The adapter device 10 is configured to be in a housing by assembling a first cover 11, a second cover 13, a frame 16, a connector conversion section 18 and a sub-frame 19. The card-shaped recording medium is able to be inserted into a space (hereinafter, referred to as "card accommodation section") surrounded by the cover 11, the cover 13 and the like from a card insertion slot 192. In the following description, a case of a media card used as the card-shaped recording medium will be described.

An internal connector 181 connected to a terminal portion of the media card is provided on an inner surface side (card accommodation section side) of the connector conversion section 18 of the adapter device 10. An external connector 182 used for connecting to an electronic apparatus is provided on an outer surface side (surface side opposite to card accommodation section side) of the connector conversion section 18.

Inside the housing, there are provided guide portions 165R, 165L, 185R and 185L which perform positioning of the media card so as to cause the terminal portion of the media card inserted from the card insertion slot 192 to be inserted into the internal connector 181.

At least one of the first cover 11 and the second cover 13 is urged in a direction toward the other cover by the cover urging portion so that a distance between the covers in the card accommodation section is caused to be smaller than a thickness of the media card to be accommodated. If the media card is inserted into this card accommodation section, the media card is pinched by the cover 11 and the cover 13. Since a cover is urged in the direction toward the other cover by the cover urging portion, the cover 11 and (or) the cover 13 are in a state of being in press contact with the media card.

There are provided adapter holding portions 20R and 20L in the sub-frame 19. In the adapter holding portions 20R and 20L, an engagement convex portion 202 (engagement portion) is formed in a movable body 201, being urged to protrude from a side end of the adapter device 10 so as to be able to maintain an insertion state when the adapter device is inserted into the electronic apparatus.

1-2. Example of Internal Configuration of Adapter Device

Figure 5:
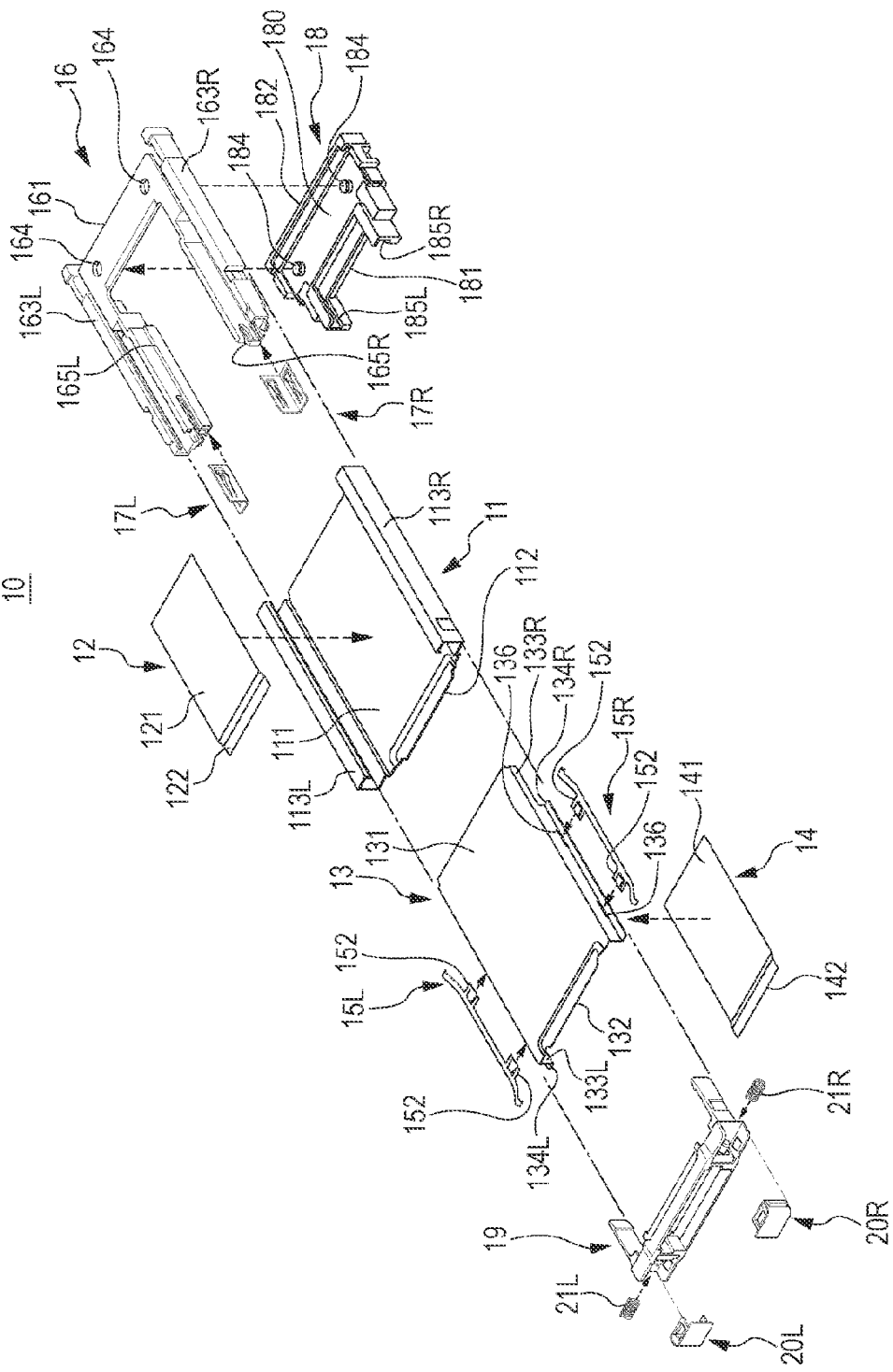
FIG. 5 is an exploded perspective view of the adapter device.
Figure 7:
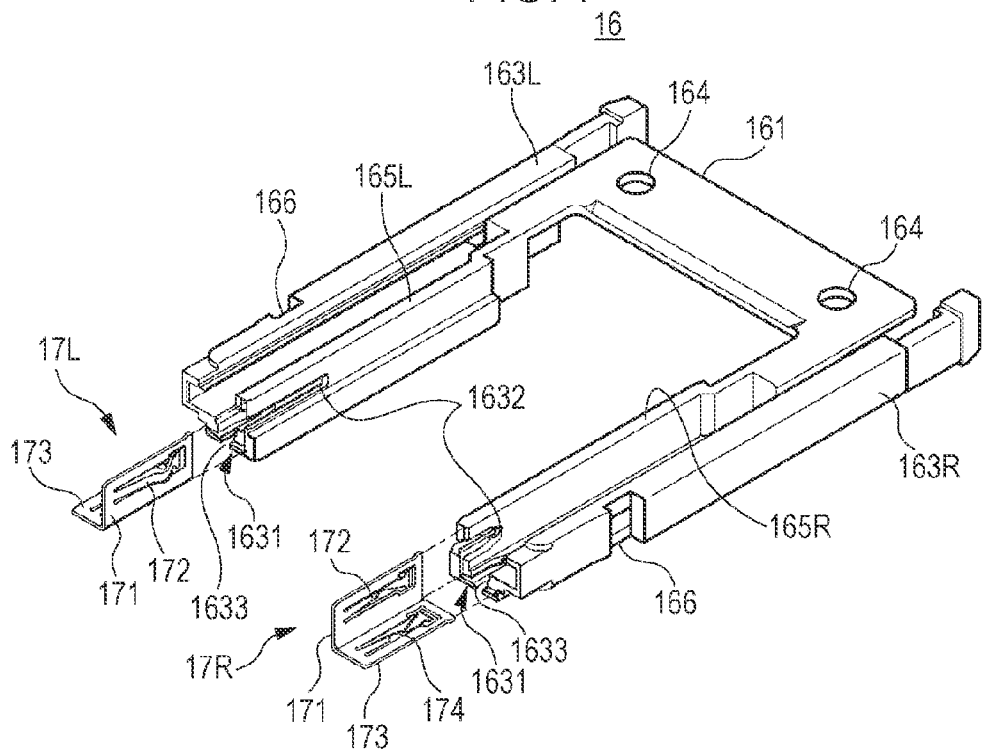
FIG. 7 is a view illustrating a frame and a conductive plate.
Figure 8:
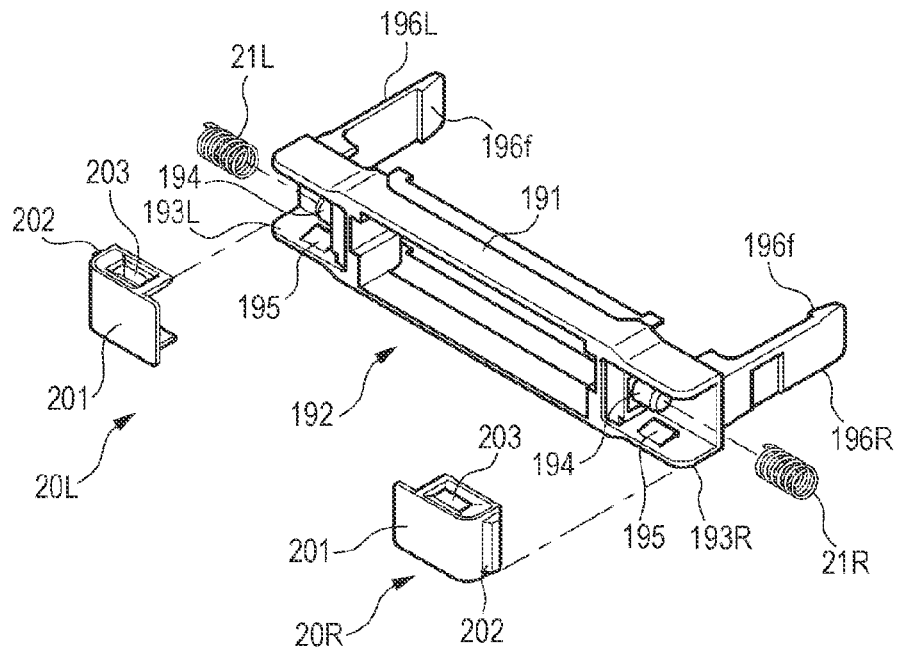
FIG. 8 is a view illustrating a sub-frame and an adapter holding portion.

FIG. 5 exemplifies an exploded perspective view of the adapter device. FIGS. 6A and 6B illustrate the cover urging portion, FIG. 7 illustrates the frame and a conductive plate, and FIG. 8 illustrates the sub-frame and the adapter holding portions, in detail.

In the cover 11, a card insertion slot side end portion on a card facing surface 111 is extruded, and an insertion guide 112 protruding in an outward direction of the adapter device 10 is formed. Therefore, the insertion guide 112 allows the media card to be smoothly inserted without abutting an end surface of the cover 11. Lateral end sides of the cover 11 are bent to form frame guides 113R and 113L so as to surround cover support portions 163 of the frame 16. A sheet-shaped protection member 12 is attached to the card facing surface 111 of the cover 11. A material having high heat conductivity is used for the cover 11 so that heat generated in the media card can be efficiently radiated, for example.

The sheet-shaped protection member 12 protects the media card so as not to cause damage and the like to a card surface when inserting and withdrawing the media card. As the sheet-shaped protection member 12, for example, a sheet formed of a material such as polyethylene can be used. A material having high heat conductivity is used for the sheet-shaped protection member 12 to reduce degradation of the heat conductivity between the media card and the cover 11 caused by the installation of the sheet-shaped protection member 12. Moreover, the sheet-shaped protection member 12 may be configured not only to protect the media card, but also to improve adhesion between the media card and the card facing surface 111.

The size of the sheet-shaped protection member 12 is set to be able to protect the media card which is to be inserted and withdrawn. An insertion guide protection portion 122 which is bent to correspond to the insertion guide 112 is formed in the card insertion slot side end portion of the sheet-shaped protection member 12.

In the cover 13, the card insertion slot side end portion on the card facing surface 131 is extruded, and an insertion guide 132 protruding in an outside direction of the adapter device 10 is formed. Therefore, the media card is smoothly inserted by the insertion guide 132 without abutting an end surface of the cover 13. Lateral sides of the cover 13 are bent in a step shape to form support portions 134R and 134L. The support portions 134R and 134L are in shapes extending in outside directions from side plate portions 133R and 133L that are in directions vertical to the card facing surface 131, and from the adapter device 10 in directions parallel to the card facing surface 131. A material having high heat conductivity is used for the cover 13 so that heat generated in the media card can be efficiently radiated, for example.

Support slits 136 are formed in the side plate portion 133R on the support portion 134R side in a card insertion direction to support the cover urging portion to be prevented from being separated from the cover 13. Engagement pieces 152 of a leaf spring 15R that is used as the cover urging portion are respectively inserted into the support slits 136, thereby fixing the leaf spring 15R to the cover 13. The support slits 136 are also formed in the side plate portion 133L on the support portion 134L side in the card insertion direction to support the cover urging portion to be prevented from being separated from the cover 13. The engagement pieces 152 of a leaf spring 15L that is used as the cover urging portion are respectively inserted into the support slits 136 of the side plate portion 133L, thereby fixing the leaf spring 15L to the cover 13. A sheet-shaped protection member 14 is attached to the card facing surface 131 of the cover 13.

The sheet-shaped protection member 14 is configured to be similar to the sheet-shaped protection member 12. In other words, the sheet-shaped protection member 14 protects the media card so as not to cause damage to a card surface when inserting and withdrawing the media card. A material having high heat conductivity is used for the sheet-shaped protection member 14 to reduce degradation of the heat conductivity between the media card and the cover 13 caused by the installation of the sheet-shaped protection member 14. Moreover, the sheet-shaped protection member 14 may be configured not only to protect the media card, but also to improve adhesion between the media card and the card facing surface 131 of the cover 13.

The size of the sheet-shaped protection member 14 is set to be able to protect the media card which is to be inserted and withdrawn. An insertion guide protection portion 142 which is bent to correspond to the insertion guide 132 is formed in the card insertion slot side end portion of the sheet-shaped protection member 14.

The cover urging portion urges the cover in a direction toward the media card, thereby causing the cover to be in press contact with the media card. In FIGS. 5, and 6A and 6B, the cover urging portion is configured to be a leaf spring, for example, and is exemplified to have a configuration in which the covers 11 and 13 are caused to be in press contact with the media card due to a spring force of the leaf spring.

As illustrated in FIGS. 6A and 6B, the leaf spring 15R is provided with a placement portion 151, engagement pieces 152, engagement claws 153, arm portions 154 and regulation portions 155. FIG. 6A exemplifies a plan view of the leaf spring, and FIG. 6B exemplifies a side view of the leaf spring.

The placement portion 151 is a portion to be placed in the support portion 134R of the cover 13, and for example, a central portion of the leaf spring 15R becomes a region of the placement portion 151.

The engagement piece 152 is in a shape protruding from a side end of the placement portion 151 in a direction toward the cover 13. A width of the engagement piece 152 is formed to correspond to the length of the support slit 136 of the cover 13, and a position of the leaf spring 15R with respect to the cover 13 is fixed by inserting the engagement piece 152 into the support slit 136. The engagement claw 153 is formed in a central portion of the engagement piece 152 by cutting and raising a portion on a placement portion side. A gap between an end portion of the engagement claw 153 on the placement portion side and an end portion of the placement portion 151 is formed to be substantially equivalent to a plate thickness of the side plate portion 133R of the cover 13. Therefore, it is possible to attach the leaf spring 15R to the cover 13 so as to prevent separation of the leaf spring 15R from the cover 13 by inserting the engagement piece 152 into the support slit 136 and pinching the side plate portion 133R of the cover 13 between the engagement claw 153 and the placement portion 151.

Although FIGS. 6A and 6B exemplify a case in which the engagement claw 153 is formed by cutting and raising the portion on the placement portion side, a mechanism to prevent separation of the cover urging portion from the cover may have a different configuration. For example, the engagement claw may be formed by bending an end portion of the engagement piece 152 in a direction toward the placement portion 151. A hook portion may be formed by protruding a side end of the engagement piece 152 so as to cause the hook portion to engage with the support slit 136, thereby being configured to prevent separation of the leaf spring 15R from the cover 13.

The arm portions 154 of the leaf spring 15R are formed by bending so as to cause positions P of the leaf spring 15R on the end portion sides to move to positions in a direction vertical (arrow FA direction) to the placement portion 151. When the position P is displaced in a direction opposite to the arrow FA direction, for example, the leaf spring 15R generates the spring force to return the position P to the position prior to being moved.

The regulation portions 155 are formed by bending end portions of the leaf spring 15R in a direction opposite to the arm portions 154. The regulation portion 155 regulates the displacement by abutting the support portion 134R of the cover 13 when the position P of the leaf spring 15R on the end portion side is displaced in a direction opposite to the arrow FA direction.

The leaf spring 15L is also configured to be similar to the leaf spring 15R, thereby attaching the leaf spring 15L to the cover 13 so as not to be separated therefrom. The leaf spring 15L also regulates the displacement in a similar manner to the leaf spring 15R.

As illustrated in FIG. 7, the frame 16 has a base portion 161, cover support portions 163R and 163L, and the guide portions 165R and 165L.

The base portion 161 is formed in a flat plate shape, and stem holes 164 are formed on a plane surface of the flat plate shape so that support stems 184 of the connector conversion section 18 are inserted therethrough.

The cover support portion 163R is provided in the base portion 161 on one lateral end side, and the cover support portion 163L is provided in the base portion 161 on the other lateral end side. The cover support portions 163R and 163L are in arm shapes extending from the lateral end sides of the base portion 161 in a withdrawal direction of the media card. The guide portion 165R is formed in the cover support portion 163R on an inner surface side, and the guide portion 165L is formed in the cover support portion 163L on the inner surface side. In the guide portions 165R and 165L, a gap between facing surfaces of the guide portion 165R and the guide portion 165L is set in accordance with the width of the media card, and a card sliding surface corresponding to the media card is formed on the facing surface in a card inserting-withdrawing direction.

The cover support portion 163R is inserted into the frame guide 113R of the cover 11 and the cover support portion 163L is inserted into the frame guide 113L of the cover 11, respectively, and thus, the cover 11 is attached to the frame 16.

Conductive plate attachment portions 1631 for fitting the below-described conductive plates 17R and 17L in the card insertion direction are respectively formed over the cover support portion 163R and the guide portion 165R, and the cover support portion 163L and the guide portion 165L. In the conductive plate attachment portion 1631, a cut 1632 where a contactor 172 of the conductive plate 17R or 17L fits and a cut 1633 where a contactor 174 fits are formed in the insertion direction of the conductive plate 17R or 17L from the end surface on the media card insertion side.

In each of the conductive plates 17R and 17L, the contactor 172 is formed on one L-shaped surface (for example, a surface to be in a direction vertical to the card facing surfaces 111 and 131) 171, and the contactor 174 is formed on the other surface (for example, a surface to be in a direction parallel to the card facing surfaces 111 and 131) 173. The contactor 172 is formed, for example, by cutting out a central portion of the surface 171 in the card inserting-withdrawing direction of the media card to perform bending, and protruding the bent portion on the card accommodation section side. The contactor 174 is formed, for example, by cutting out a central portion of the surface 173 in the card inserting-withdrawing direction of the media card to perform bending, and protruding the bent portion onto the cover 11 side.

The conductive plate 17R is inserted into the conductive plate attachment portion 1631 that is formed over the cover support portion 163R and the guide portion 165R. In this case, the contactor 172 is inserted into the cut 1632 and the contactor 174 is inserted into the cut 1633. If the conductive plate 17R is inserted into the conductive plate attachment portion 1631, the contactor 172 of the conductive plate 17R is in a state of protruding further toward the card accommodation section side than the media card sliding surface of the guide portion 165R, and the contactor 174 is in a state of protruding further toward the cover 11 side than the guide portion 165R.

The conductive plate 17L is inserted into the conductive plate attachment portion 1631 that is formed over the cover support portion 163L and the guide portion 165L. In this case, the contactor 172 is inserted into the cut 1632 and the contactor 174 is inserted into the cut 1633. If the conductive plate 17L is inserted into the conductive plate attachment portion 1631, the contactor 172 of the conductive plate 17L is in the state of protruding further toward the card accommodation section side than the media card sliding surface of the guide portion 165L, and the contactor 174 is in the state of protruding further toward the cover 11 side than the guide portion 165L.

Engagement concave portions 166 are respectively formed on outside surfaces of the cover support portion 163R and the cover support portion 163L. A tip side from the engagement concave portion 166 of the cover support portion 163R is configured to have an aperture for inserting a sub-frame engagement portion 196R of the sub-frame 19 to be formed between the frame guide 113R of the cover 11 and the cover support portion 163R of the frame 16. Similarly, a tip side from the engagement concave portion 166 of the cover support portion 163L is configured to have the aperture for inserting a sub-frame engagement portion 196L of the sub-frame 19 to be formed between the frame guide 113L of the cover 11 and the cover support portion 163L of the frame 16.

A hook portion 196f of the sub-frame engagement portion 196R which is inserted into the aperture between the frame guide 113R and the cover support portion 163R is engaged with the engagement concave portion 166 of the cover support portion 163R. Another hook portion 196f of the sub-frame engagement portion 196L which is inserted into the aperture between the frame guide 113L and the cover support portion 163L is engaged with the engagement concave portion 166 of the cover support portion 163L.

As illustrated in FIG. 5, the connector conversion section 18 has a base portion 180, the internal connector 181, the external connector 182, the support stems 184, and the guide portions 185R and 185L.

In the base portion 180, a plane surface thereof facing the base portion 161 of the frame 16 is a frame attachment surface. The internal connector 181 to be connected to the terminal portion of the media card is provided on a surface of the base portion 180 on the card accommodation section side, and the external connector 182 for connecting the adapter device to an electronic apparatus is provided on the opposite side surface thereof.

The support stems 184 to be inserted through the stem holes 164 of the frame 16 are formed on the frame attachment surface of the base portion 180. The support stem 184 is inserted through the stem hole 164 of the frame 16, and thus, the base portion 180 is attached to the frame 16 to be movable in a direction orthogonal (a direction vertical to the card surface of the media card) to the inserting-withdrawing direction of the media card.

The guide portion 185R is provided on one lateral end side of the base portion 180, and the guide portion 185L is provided on the other lateral end side of the base portion 180. The guide portions 185R and 185L regulate a position of the media card to make the terminal portion of the inserted media card to be in the position of the internal connector 181.

As illustrated in FIG. 8, the sub-frame 19 has a base portion 191, accommodation portions 193R and 193L, and the sub-frame engagement portions 196R and 196L.

The card insertion slot 192 is provided in the base portion 191. The accommodation portion 193R for accommodating the adapter holding portion 20R is formed in one side end of the base portion 191, and the accommodation portion 193L for accommodating the adapter holding portion 20L is formed in the other side end.

A spring holding portion 194 and a movable body holding portion 195 is formed in each of the accommodation portions 193R and 193L.

The spring holding portion 194 holds an urging spring, for example, a coil spring 21R or 21L which respectively urges the adapter holding portions 20R or 20L in order to regulate a movement in the withdrawal direction of the adapter device 10 that is inserted into the electronic apparatus so as not to be withdrawn from the electronic apparatus.

The movable body holding portion 195 holds the movable body 201 which is a main body portion of the adapter holding portion 20R or 20L to be movable in a width direction of the media card. Specifically, the adapter holding portion 20R is fit into the accommodation portion 193R, and the movable body holding portion 195 fits the holding hole 203 provided in the movable body 201, thereby holding the movable body 201 to be movable in the width direction of the media card without falling from the sub-frame 19. Similarly, the adapter holding portion 20L is fit into the accommodation portion 193L, and the movable body holding portion 195 fits into the holding hole 203 provided in the movable body 201, thereby holding the movable body 201 to be movable in the width direction of the media card without falling from the sub-frame 19.

The sub-frame engagement portion 196R is provided on one lateral end side of the base portion 191, and the sub-frame engagement portion 196L is provided on the other lateral end side of the base portion 191. The sub-frame engagement portions 196R and 196L are in shapes extending in the card insertion direction from side ends of the base portion 191. The hook portion 196f is formed in a tip of each of the sub-frame engagement portions 196R and 196L. The sub-frame engagement portion 196R is inserted into the aperture between the cover support portion 163R of the frame 16 and the frame guide 113R of the cover 11, and then, the hook portion 196f engages with the engagement concave portion 166 provided in the cover support portion 163R. Similarly, the sub-frame engagement portion 196L is inserted into the aperture between the cover support portion 163L of the frame 16 and the frame guide 113L of the cover 11, and then, the hook portion 196f engages with the engagement concave portion 166 provided in the cover support portion 163L. In this manner, the sub-frame 19 is attached to the frame 16 so as not to be detached therefrom.

In the adapter holding portions 20R and 20L, there are provided the engagement convex portion 202 and the holding hole 203 in the movable body 201. The engagement convex portion 202 is formed to protrude in the width direction of the media card from the movable body 201. If the adapter device 10 is inserted into a connector of an electronic apparatus, the engagement convex portion 202 engages with an engagement portion provided in the electronic apparatus, thereby regulating a movement of the adapter device 10 in the withdrawal direction.

The holding hole 203 is provided in a position facing the movable body holding portion 195 of the sub-frame 19, and of which length in the width direction of the media card is set to be longer than that of the movable body holding portion 195. The movable body holding portion 195 fits into the holding hole 203 so that the adapter holding portions 20R and 20L are held to be movable with respect to the sub-frame 19 in the width direction of the media card.

The coil spring 21R is held by the spring holding portion 194 of the sub-frame 19 so as to cause the engagement convex portion 202 of the adapter holding portion 20R to be urged protruding to the outer side further than a side surface of the sub-frame 19. Similarly, the coil spring 21L is held by the spring holding portion 194 of the sub-frame 19 to cause the engagement convex portion 202 of the adapter holding portion 20L to be urged protruding to the outer side further than another side surface of the sub-frame 19.

Figure 9:
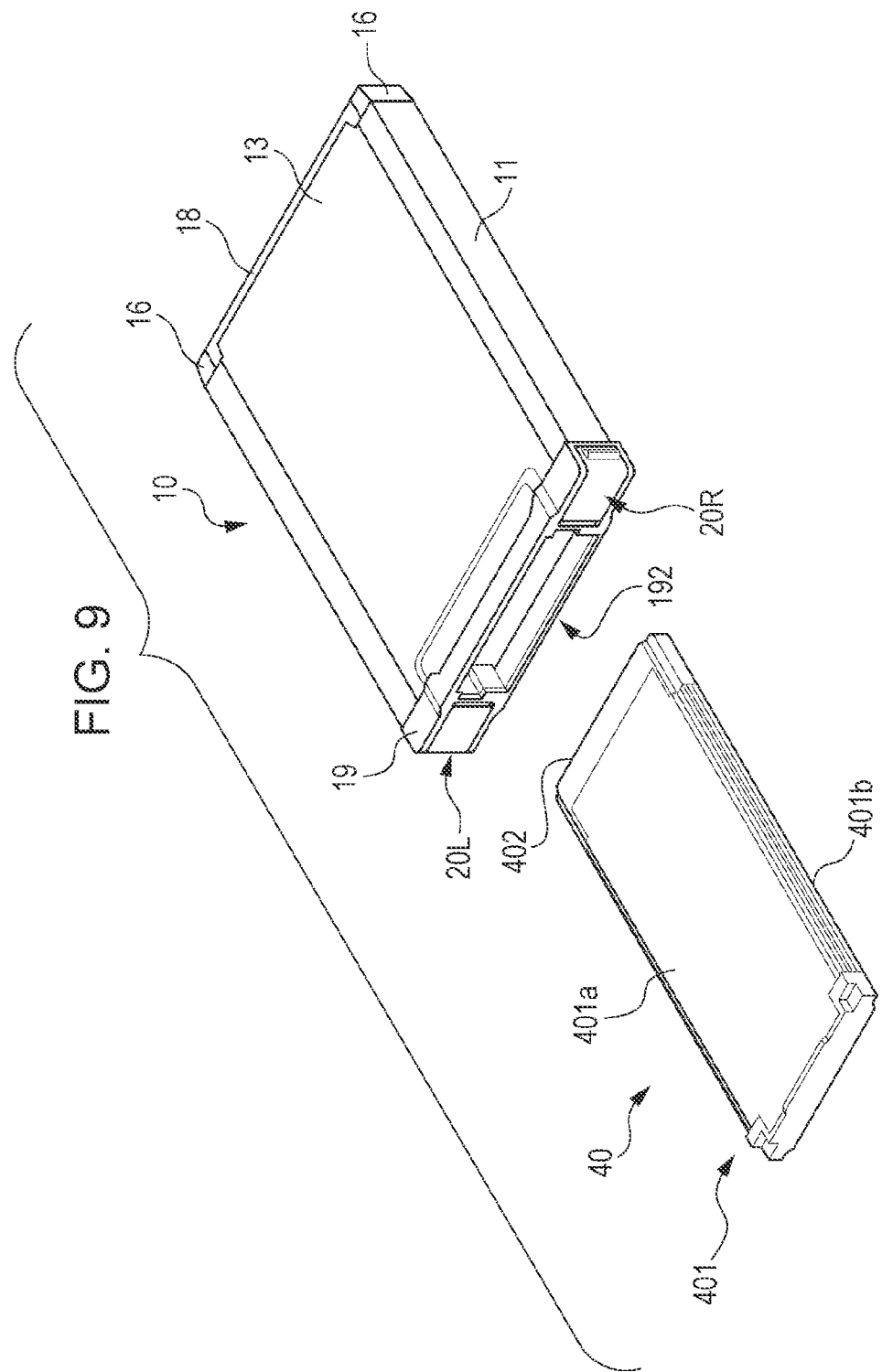
FIG. 9 is a perspective view exemplifying an appearance of a card-shaped recording medium.

2. Insertion and Withdrawal Operations of Recording Medium with Respect to Adapter Device FIG. 9 is a perspective view exemplifying an appearance of the card-shaped recording medium, for example, the media card which is mounted on the adapter device 10.

A media card 40 is configured to include a rectangular housing 401 having a suitable thickness, a semiconductor memory accommodated in this housing 401 (not illustrated), a control device thereof, and the like. The housing 401 is formed by assembling a cover 401a and a cover 401b which overlap each other, and the semiconductor memory, control device and the like are accommodated in a space surrounded by the covers 401a and 401b. A terminal portion 402 to be electrically connected to another electronic apparatus (not illustrated) is provided in one end portion of the housing 401 in the inserting-withdrawing direction. The terminal portion 402 is connected to the control device and the like in the housing 401 to transmit an information signal, a control signal and the like between the control device or the semiconductor memory and an external apparatus. The control device accommodated in the housing 401 is configured to include a central processing unit and the like to write an information signal in the semiconductor memory or read out an information signal recorded in the semiconductor memory.

The cover 401a and the cover 401b of the housing 401 are formed with a material having high reliability (heat resistance, shock resistance, durability against insertion and withdrawal, and the like). Particularly, since heat is generated through an operation, the semiconductor memory and the control device are formed with a material which can relatively and easily transmit heat so as to be able to discharge the generated heat to the outside in an early stage of operation.

Figure 10:
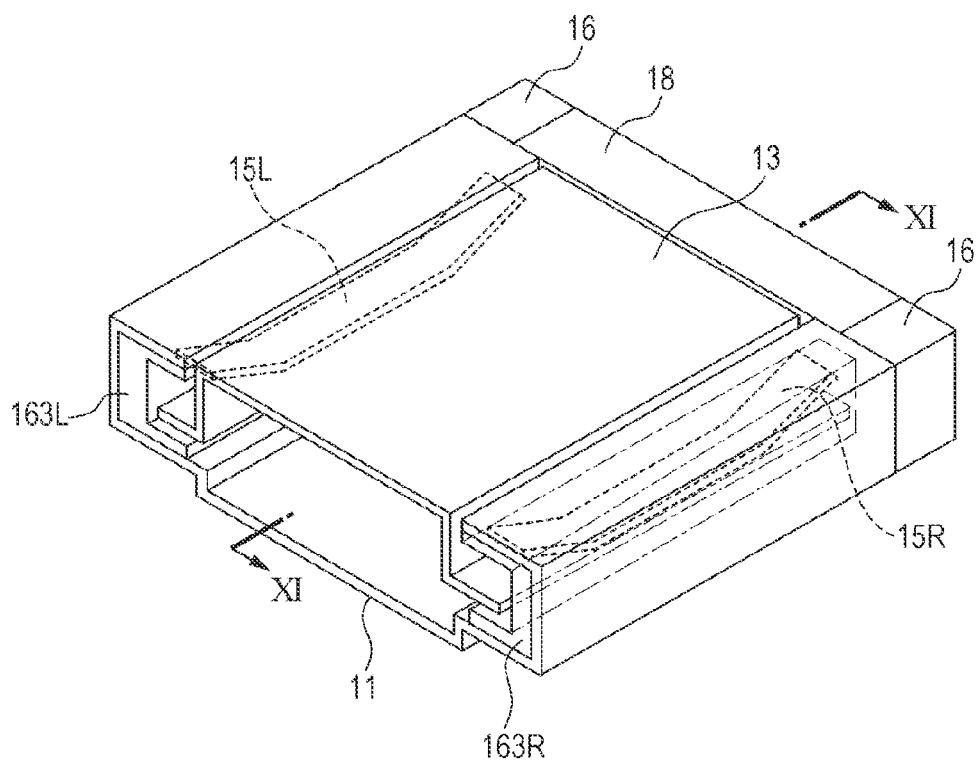
FIG. 10 is a view schematically illustrating positional relationships and the like of covers and leaf springs in the adapter device.

FIG. 10 schematically illustrates positional relationships and the like of the covers and the leaf springs in the adapter device. FIGS. 11A to 11D schematically illustrate mounting states of the recording medium in the adapter device, for example, mounting states of the media card in the adapter device. FIGS. 11A to 11D indicate the position taken along line XI-XI in FIG. 10.

The cover 11 and the cover 13 are urged by the leaf springs 15R and 15L so as to cause a gap between the cover 11 and the cover 13 to be smaller than a card thickness of the media card 40. Here, if the media card 40 is inserted from the card insertion slot 192 of the sub-frame 19, the inserted media card 40 moves the cover 11 and (or) the cover 13 in a direction opposite to an urging direction of the leaf springs 15R and 15L.

Figure 11A:
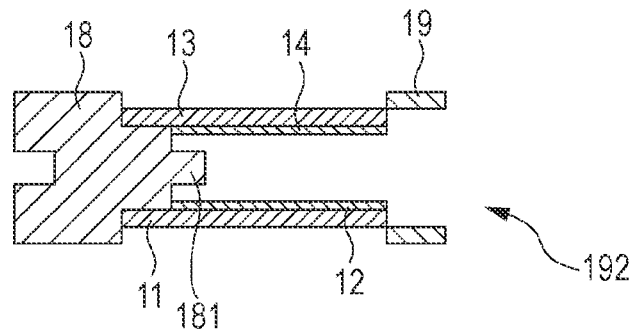
FIGS. 11A to 11D are views schematically illustrating mounting states of the recording medium in the adapter device.
Figure 11B:
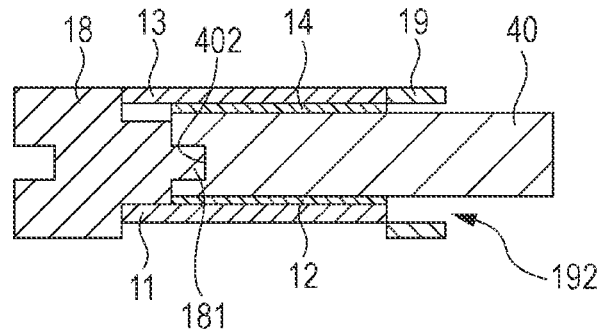
Figure 11C:
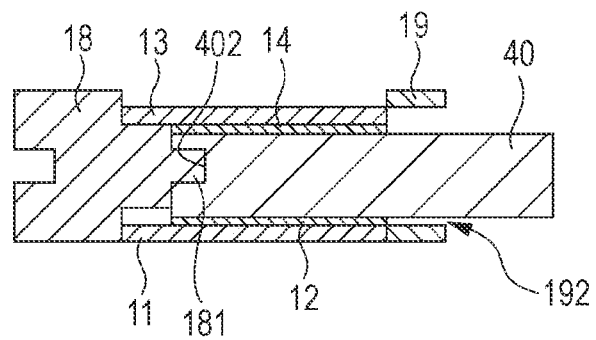
Figure 11D:
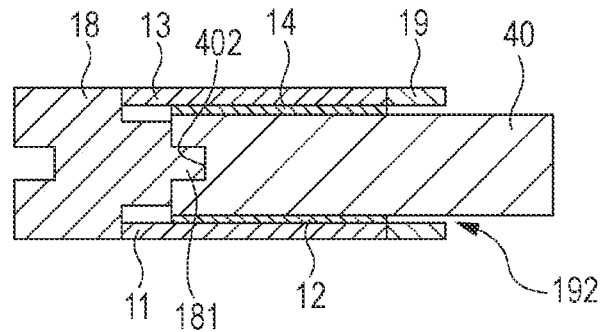

FIG. 11A illustrates a state before the card insertion. FIGS. 11B to 11D exemplify cases in which a size tolerance of the media card is the maximum within the tolerance range. For example, FIG. 11B exemplifies a case in which the size tolerance of one surface (for example, upper surface) of the media card 40 is the maximum within the tolerance range. Even though the size tolerance on the upper surface of the media card 40 is high in this regard, the cover 13 moves against the spring force of the leaf spring, and thus, the covers 11 and 13 are in the state of being in press contact with the media card 40. FIG. 11C exemplifies a case in which the size tolerance of the other surface (for example, lower surface) of the media card 40 is the maximum within the tolerance range. Even though the size tolerance on the lower surface of the media card 40 is high in this regard, the cover 11 moves against the spring force of the leaf spring, and thus, the covers 11 and 13 are in the state of being in press contact with the media card 40. FIG. 11D exemplifies a case in which the size tolerance of both the surfaces of the media card 40 is the maximum within the tolerance range. Even though the size tolerance on the upper surface and the lower surface of the media card 40 is high in this regard, the covers 11 and 13 move against the spring force of the leaf spring, and thus, the covers 11 and 13 are in the state of being in press contact with the media card 40.

As in the above, the cover 11 and the cover 13 are urged to have a narrow gap therebetween by the leaf springs 15R and 15L, and thus, it is possible to bring the cover 11 and the cover 13 into press contact with the media card 40, even if a thickness of the media card 40 has a variation. Therefore, heat conductivity between the media card 40 and the adapter device 10 can be enhanced so that heat generated in the media card 40 can be radiated throughout a wide area.

As described above, the cover support portion 163R is inserted into the frame guide 113R of the cover 11 and the cover support portion 163L is inserted into the frame guide 113L of the cover 11, respectively, and thus, the cover 11 is attached to the frame 16. Therefore, as illustrated in FIGS. 11C and 11D, if the size tolerance on the lower surface of the media card 40 is the maximum within the tolerance range, for example, a position of the cover 11 moves toward a lower side when a position of the media card 40 is set to be a standard. The cover 11 is fixed to the frame 16, and thus, a position of the frame 16 moves toward a lower side together with that of the cover 11. However, as described above, the connector conversion section 18 is attached to the frame 16 to be movable in the direction orthogonal (the direction vertical to the card surface of the media card) to the inserting-withdrawing direction of the media card. For this reason, even if the size tolerance on the lower surface of the media card 40 is high and the positions of the cover 11 and the frame 16 move toward the lower side with respect to the media card 40, a position of the internal connector 181 moves toward an upper side with respect to the frame 16 to be in a position corresponding to the terminal portion 402 of the inserted media card 40. Therefore, regardless of the size tolerance on both the surfaces of the media card 40, the covers 11 and 13 can be in press contact with the media card 40.

Figure 12A:
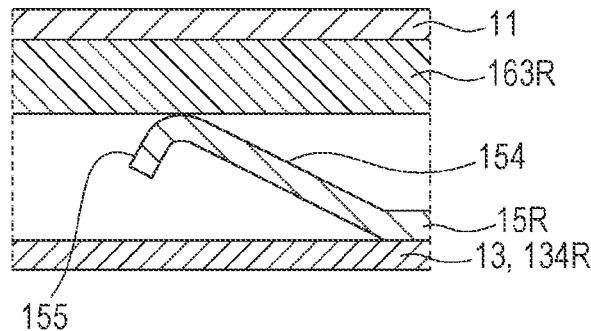
FIGS. 12A to 12C are views describing operations when a regulation portion is provided.
Figure 12B:
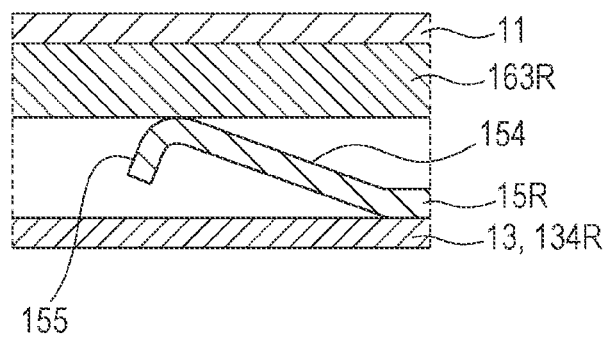
Figure 12C:
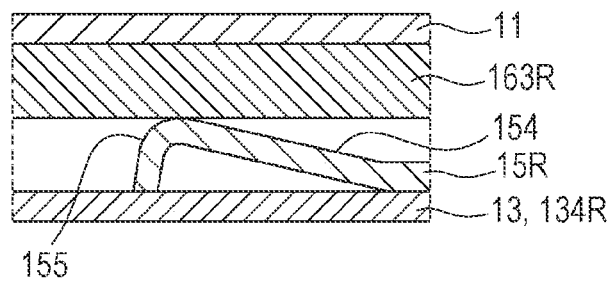

As illustrated in FIGS. 12A to 12C, the regulation portion is provided in the leaf spring to regulate a movement of the cover. For example, as illustrated in FIG. 12A, a regulation portion 155 is provided by bending an end portion of the leaf spring 15R. Here, if the cover 11 and (or) the cover 13 move in a direction in which the gap between the covers becomes wide, the regulation portion 155 of the leaf spring 15R moves in a direction toward the support portion 134R of the cover 13, as illustrated in FIG. 12B. As illustrated in FIG. 12C, if the regulation portion 155 abuts the support portion 134R of the cover 13, a movement of the cover is regulated. For this reason, it is possible to prevent a force from being applied to the arm portion 154 of the leaf spring 15R at an angle equal to or greater than a predetermined angle in a direction opposite to the urging direction. Therefore, it is possible to prevent degradation of an urging force against the cover, and the like occurring in plastic deformation of the leaf spring due to an excessive movement of the cover.

Figure 13A:
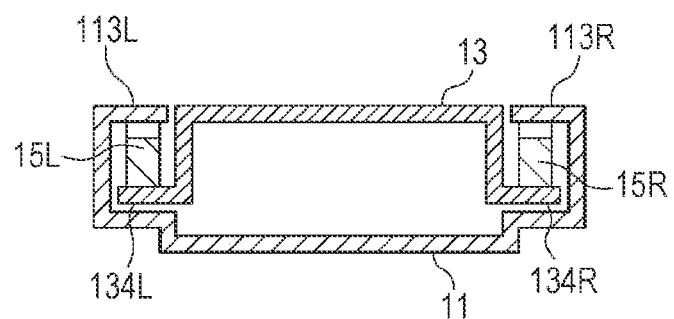
FIGS. 13A and 13B are views exemplifying another configuration of the cover.
Figure 13B:
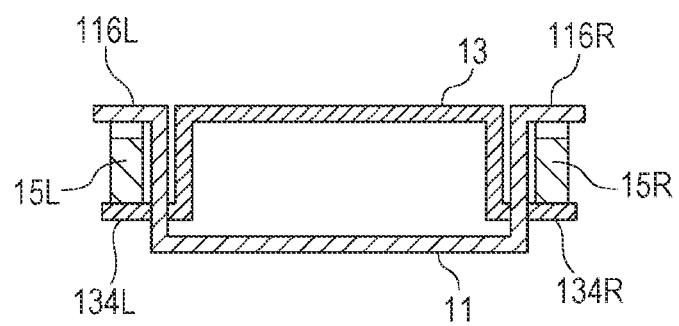

Incidentally, as illustrated in FIG. 13A, the above-described embodiment exemplifies a configuration in which the leaf spring 15R or 15L is provided between the frame guide 113R or 113L provided by bending the side end portion of the cover 11 in an angular U-shape and the support portion 134R or 134L of the cover 13. However, the shapes of the covers 11 and 13, the positions of the leaf springs 15R and 15L, and the like are not limited to the above-described embodiment. For example, as illustrated in FIG. 13B, support portions 116R and 116L may be provided by forming the side end portions of the cover 11 to be in step shapes, thereby providing the leaf spring 15R or 15L between the support portion 116R or 116L and the support portion 134R or 134L. The cover urging portion may be provided between the frame 16 or the connector conversion section 18 and the cover 11, or between the frame 16 or the connector conversion section 18 and the cover 13 to be configured to urge the cover 11 and the cover 13 to have a gap therebetween smaller than the thickness of the media card.

In the embodiment described above, although a configuration is exemplified in which the leaf springs 15R and 15L are used as cover urging portions to cause the cover 11 and the cover 13 to be in press contact with the media card, a coil spring, a torsion spring and the like may be used as the cover urging portion. An elastic body and the like may be used without being limited to a spring. Moreover, as illustrated in configurations of FIGS. 13A and 13B, the cover 11 and the cover 13 are switched to be in an installation position of the cover urging portion with respect to an insertion position of the media card. Therefore, if the cover urging portion is fixed to either one of the cover 11 or the cover 13, and the urging force is generated to widen the gap between the cover 11 and the cover 13, and it is possible to urge the cover 11 and the cover 13 in a direction to pinch the media card. Therefore, the cover urging portion can be easily attached and the like. Regarding the adapter device, the cover 11 and the cover 13 may be configured not to be switched to be in the installation position of the cover urging portion with respect to the insertion position of the media card. In this case, if the cover urging portion is fixed to both of the cover 11 and the cover 13, and the urging force is generated to narrow the gap between the cover 11 and the cover 13, it is possible to urge the cover 11 and the cover 13 in the direction to pinch the media card.

Moreover, the regulation portion may be provided in the cover without being limited to a case in which it is provided in the cover urging portion. For example, the movement of the cover may be regulated by bending the side end of the cover in a direction toward the other cover, and abutting an end portion of the bent portion on the other cover when the movement of the cover becomes significant.

3. Another Operation of Adapter Device

The cover of the media card inserted into the adapter device 10 is formed of a material having conductivity, for example, a metal plate.

Figure 14:
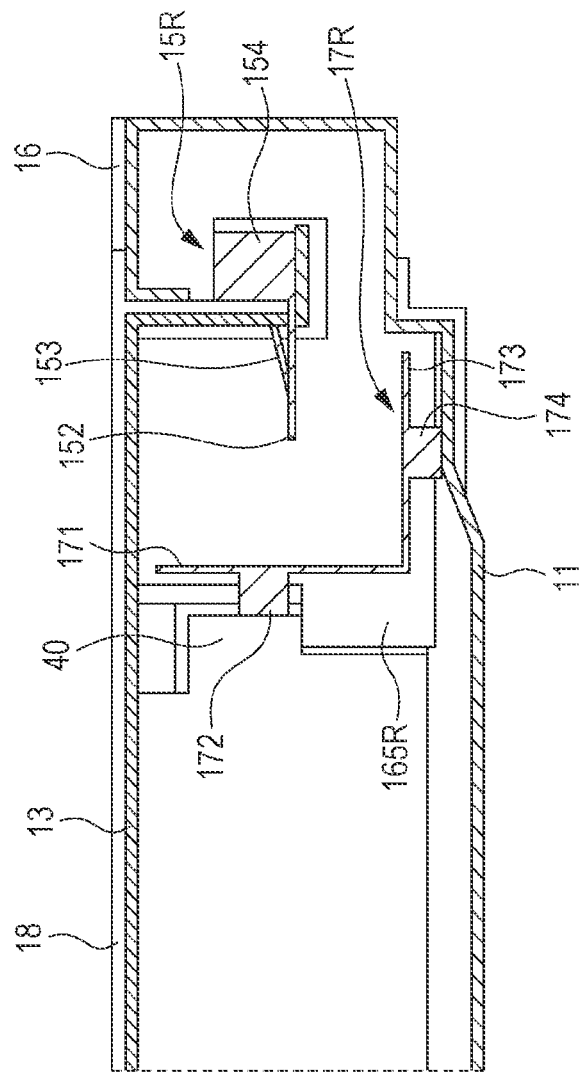
FIG. 14 is a view describing an operation of the conductive plate.

The contactor 172 of the conductive plate 17R illustrated in FIG. 7 protrudes further toward the card accommodation section side than the media card sliding surface of the guide portion 165R. Therefore, as illustrated in FIG. 14, if the media card 40 is inserted into the adapter device 10, the contactor 172 of the conductive plate 17R is in a state of being in contact with the media card 40, and thus, the conductive plate 17R and the cover of the media card 40 are in a state of being electrically connected to each other. The contactor 174 of the conductive plate 17R protrudes further toward the cover 11 side than the guide portion 165R or 165L. Therefore, if the cover 11 is attached after attaching the conductive plate 17R to the frame 16, as illustrated in FIG. 14, the contactor 174 is in a state of being in contact with the cover 11, and the conductive plate 17R and the cover 11 are in a state of being electrically connected to each other. The conductive plate 17L is also configured in the similar manner.

As in the above, if the media card 40 is inserted into the adapter device 10, the cover of the media card 40 is electrically connected to the cover 11 of the adapter device 10 through the conductive plates 17R and 17L. Therefore, for example, if the cover 11 of the adapter device 10 is grounded, it is possible to reduce unnecessary radiation from the media card 40 or the influence of static electricity to the media card 40.

Figure 15A:
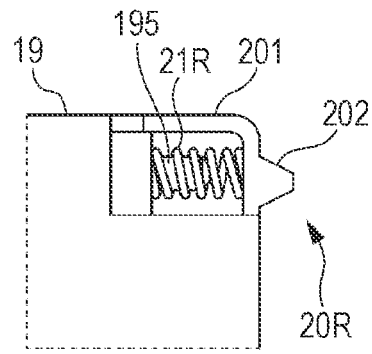
FIGS. 15A to 15C are views describing operations of the adapter holding portion.
Figure 15B:
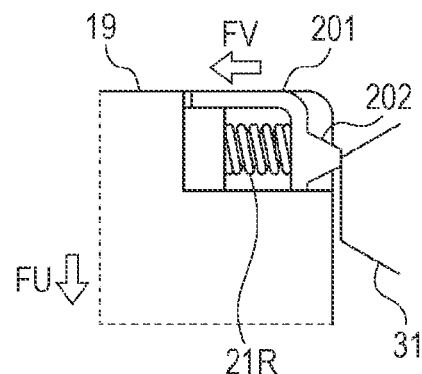
Figure 15C:
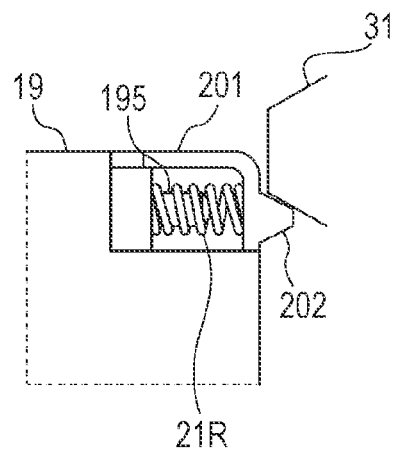
Figure 17:
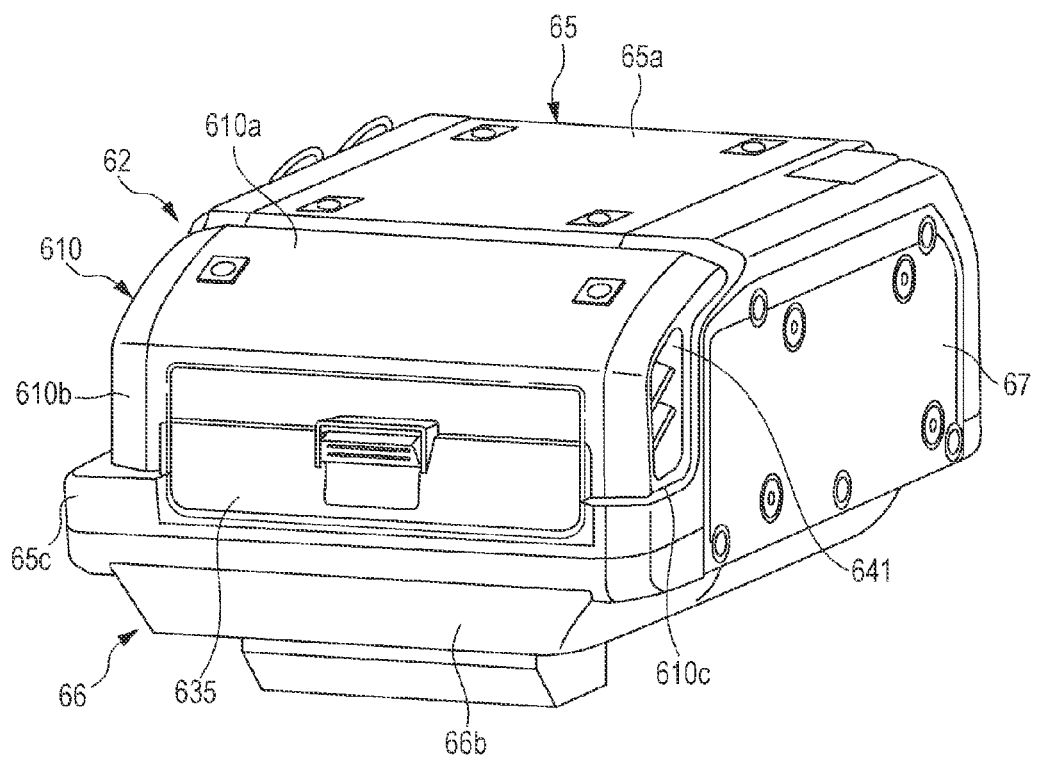
FIG. 17 is a perspective view exemplifying an appearance of a recording-reproducing apparatus in a state where an opening-closing lid is closed.
Figure 18:
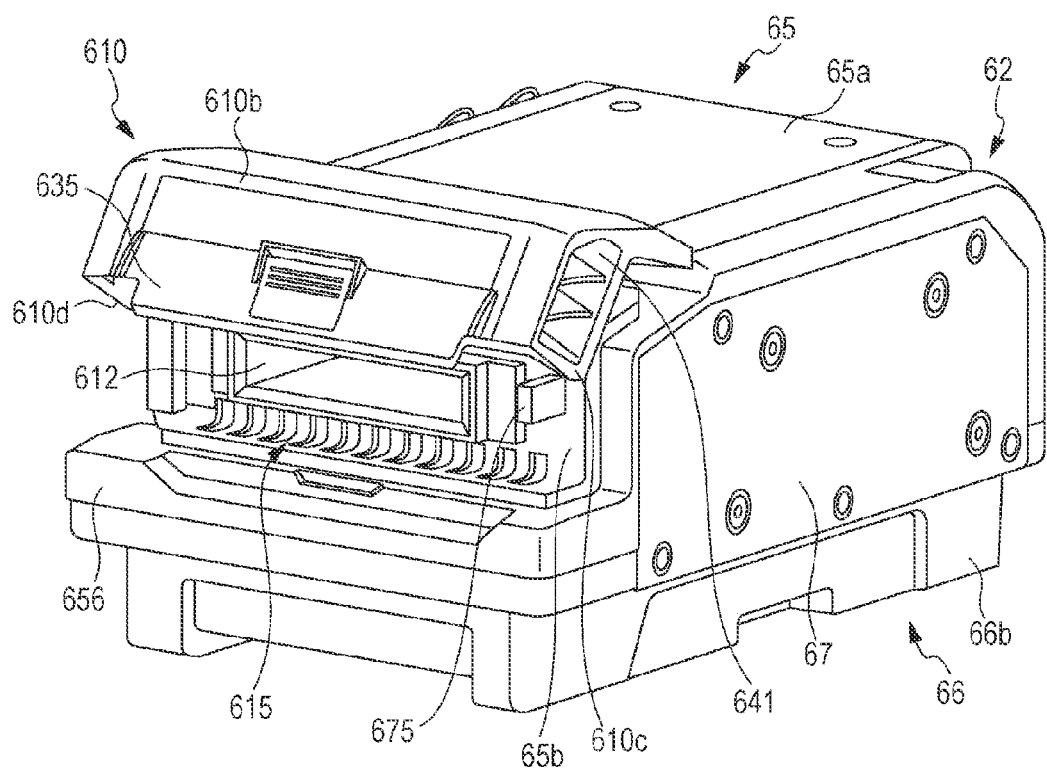
FIG. 18 is a perspective view exemplifying an appearance of the recording-reproducing apparatus in a state where the opening-closing lid is open.

The adapter holding portions 20R and 20L are provided in the adapter device 10. FIGS. 15A to 15C are views describing operations of the adapter holding portion 20R. As illustrated in FIG. 15A, the engagement convex portion 202 of the adapter holding portion 20R is urged to protrude in an outward direction further than a side surface of the sub-frame 19 by the coil spring 21R. An engagement portion 31 is provided in an insertion slot of an electronic apparatus for the adapter device. Therefore, when inserting the adapter device 10, as illustrated in FIG. 15B, the movable body 201 moves in an inside direction (arrow FV direction) in accordance with the engagement portion 31 of the electronic apparatus abutting the engagement convex portion 202 and the adapter device 10 moving in the insertion direction (arrow FU direction). Thereafter, if the adapter device 10 is inserted into a predetermined position of the electronic apparatus, as illustrated in FIG. 15C, the engagement convex portion 202 passes through a position of the engagement portion 31 and returns to the position to protrude in the outward direction further than the side surface of the sub-frame 19, and thus, the engagement convex portion 202 is in a state of being engaged with the engagement portion.

If an evulsion force (force in a direction opposite to the arrow FU) is added to the adapter device 10 in a state illustrated in FIG. 15C, the movable body 201 moves in the inside direction against the spring force of the coil spring 21R due to the movement of the engagement convex portion 202 and the engagement portion 31. Therefore, it is possible to release the engaged state where the engagement convex portion 202 is engaged with the engagement portion 31. The adapter holding portion 20L also performs the operation in a similar manner to the adapter holding portion 20R.

Therefore, it is possible to prevent the withdrawal of the adapter device 10 from an electronic apparatus due to the adapter holding portions 20R and 20L. An engaged state can be released by increasing the evulsion force when taking out the adapter device 10 from the electronic apparatus, and thus, it is possible to take out the adapter device 10 from the electronic apparatus. Moreover, the evulsion force when taking out the adapter device 10 from the electronic apparatus is set to be greater than the evulsion force when taking out the media card 40 from the adapter device 10. In this manner, only the media card 40 can be taken out from the adapter device 10 in a state where the adapter device 10 is inserted into the electronic apparatus so that replacement and the like of a media card can be easily performed.

4. Electronic Apparatus Using Adapter Device

FIG. 16 exemplifies an appearance of the electronic apparatus, for example, a video camera for professional purposes using an adapter device.

In a video camera 50, a lens unit 502 and the like are detachably attached to a front surface of a camera main body unit 501, and a recording-reproducing apparatus 60 using the adapter device is detachably attached to a rear surface of the camera main body unit 501.

The camera main body unit 501 is configured to include an imaging section which creates an imaged picture signal, a signal processing section which processes various camera signals with respect to the created image picture signal, a control unit which controls an imaging operation, and a signal recording-reproducing operation and the like. The lens unit 502 images a desired optical image of a subject on an imaging plane of the imaging unit. The recording-reproducing apparatus 60 records and reproduces an information signal, that is, an image signal and the like of the imaged picture using the recording medium.

FIGS. 17 to 23 illustrate an example of an embodiment of the recording-reproducing apparatus. The recording-reproducing apparatus 60 records and reproduces an information signal by employing an adapter device which enables the use of a media card having a physical specification different from that of another media card or that of the media card used in the recording-reproducing apparatus 60. A recording apparatus which only records an information signal or a reproducing apparatus which only reproduces an information signal may be provided in the electronic apparatus, without being limited to a recording-reproducing apparatus.

The recording-reproducing apparatus 60 is configured to include an outer case 62, a media holder 63 which is accommodated in this outer case 62, a recording-reproducing apparatus main body (not illustrated) and the like. The outer case 62 is configured to include an upper cover 65, a lower cover 66, a left side surface panel 67, a right side surface panel 68, a rear surface panel 69 and an opening-closing lid 610. The outer case 62 is not limited to this configuration.

The upper cover 65 has an upper surface portion 65a which covers the upper part of the media holder 63, a front surface portion 65b which is connectively formed in a front portion of the upper surface portion 65a so as to hang down from the upper surface portion 65a, a projection portion 65c which is connectively formed in a lower portion of the front surface portion 65b so as to hang down from the upper surface portion 65a, and a rear surface portion 65d which is connectively formed in a back portion of the upper surface portion 65a. The upper surface portion 65a is configured to be a portion such as a substantially square-shaped ceiling which can cover the entire upper surface of the media holder 63. The projection portion 65c is provided to protrude forward in a lower end of the front surface portion 65b.

An insertion slot 612 into which the media card or the adapter device is inserted is provided in a substantially central portion of the front surface portion 65b of the upper cover 65. Hereinafter, the description will be given on the premise that the adapter device is inserted.

A rod opening hole 613 through which a tip of an eject rod 675 of the media holder 63 protrudes is provided beside the insertion slot 612 of the front surface portion 65b. A pair of arm opening holes 614 through which tips of right and left lid arms 631 and 632 of the media holder 63 protrude are respectively provided in portions formed across the front surface portion 65b to the upper surface portion 65a. The pair of arm opening holes 614 are arranged to be at the outside from both ends of the insertion slot 612 in a longitudinal direction.

Air passages 615 are provided at a lower portion of the front surface portion 65b of the upper cover 65. A depression portion 618 is provided in a tip of the projection portion 65c of the upper cover 65 so as to be engaged with a tip portion of the opening-closing lid 610.

The lower cover 66 covers a lower surface of the upper cover 65, thereby having a shape and a size corresponding to a plane surface shape of the upper cover 65. The lower cover 66 has a lower surface portion 66a forming a substantially square shape of the upper cover 65, and a side surface portion 66b formed to surround four sides of the lower surface portion 66a. The media holder 63 is attached to the lower surface portion 66a of the lower cover 66 to be able to change a space of a medium accommodation section 647 thereof to be wide and narrow. Then, in a state where the media holder 63 is accommodated in the lower surface portion 66a, the upper cover 65 overlaps the lower cover 66 from above, thereby being detachably fixed to each other by using a plurality of fixing screws and the like.

The left side surface panel 67 closes an opening portion formed on a left side surface of the upper cover 65 and the lower cover 66 overlapped above and below, and is formed as a plate-shaped member. The left side surface panel 67 is detachably fixed to the upper cover 65 and the lower cover 66. The right side surface panel 68 closes an opening portion formed on a right side surface formed by the upper cover 65 and the lower cover 66 overlapped above and below, and is formed as the plate-shaped member. The right side surface panel 68 is detachably fixed to the upper cover 65 and the lower cover 66. A connector unit 621 is attached on an inner surface of the right side surface panel 68 so as to be electrically connected to an external apparatus.

Figure 19:
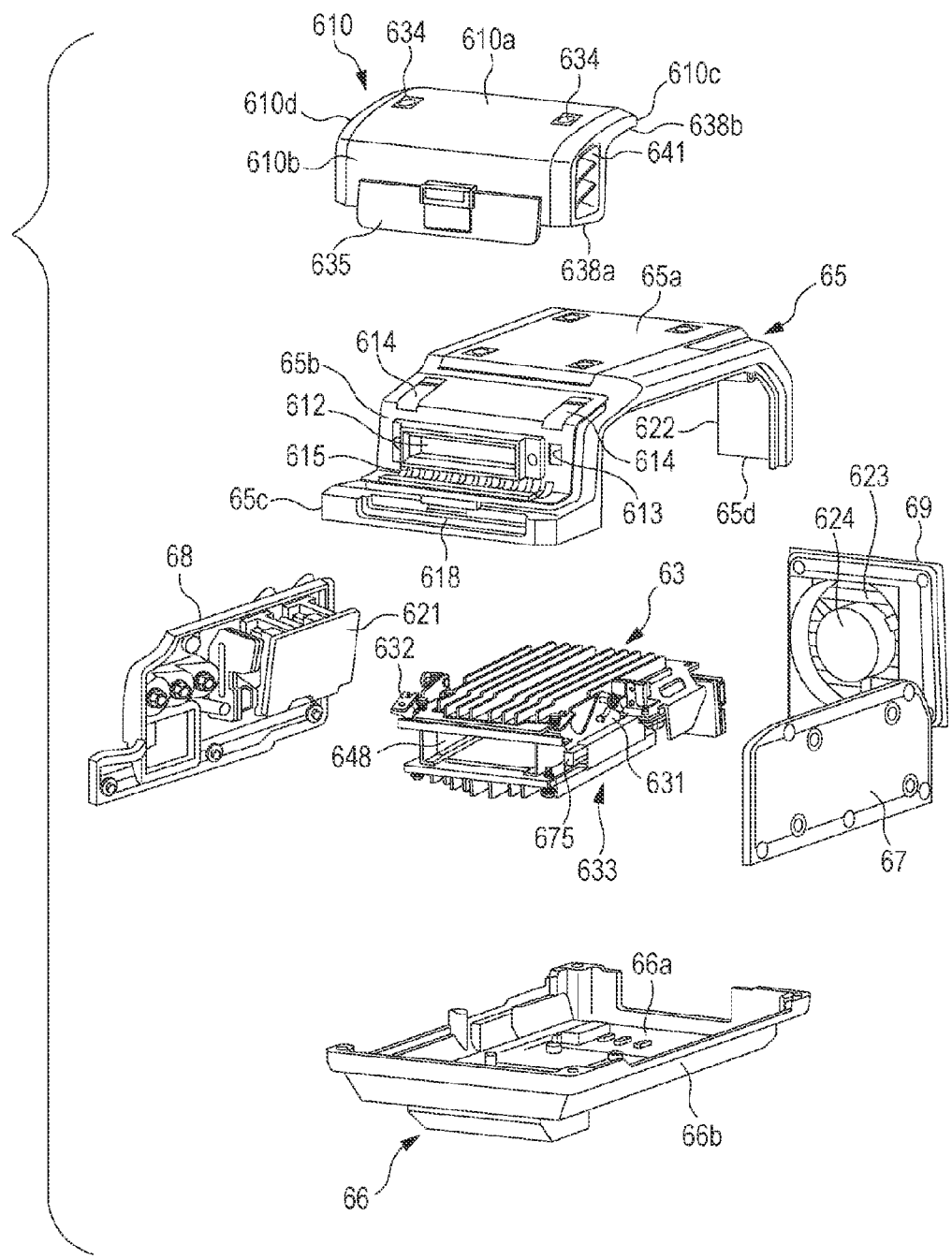
FIG. 19 is an exploded perspective view of the recording-reproducing apparatus.

An opening portion 622 to be engaged with the rear surface panel 69 is provided across the rear surface portion 65d of the upper cover 65 and the side surface portion 66b of the lower cover 66 on the rear surface side. The rear surface panel 69 is detachably fixed to the upper cover 65 and the lower cover 66 in a state when fitting into the opening portion 622. As illustrated in FIG. 19, a ventilation opening 623 having a plurality of opening grooves is provided in the rear surface panel 69. The ventilation opening 623 is provided in a substantially central portion of the rear surface panel 69. An exhaust fan 624 indicating a specific example of a cooling fan is attached to an inner side of this ventilation opening 623.

The opening-closing lid 610 has an upper surface portion 610a which covers the upper part of the projection portion 65c of the upper cover 65, a front surface portion 610b which is connectively formed in a front end of the upper surface portion 610a, and side surface portions 610c and 610d which are connectively formed in the right and left sides of the upper surface portion 610a and the front surface portion 610b. The upper surface portion 610a has a size capable of covering a portion from the projection portion 65c of the upper cover 65 to a front portion of the upper surface portion 65a. Screw insertion holes 634 and 634 for fixing the tip portions of the right and left lid arms 631 and 632 are provided in intermediate portions of the upper surface portion 610a in a front-back direction, that is, in both side portions in a transverse direction.

The front surface portion 610b of the opening-closing lid 610 is formed to fall down from the front end of the upper surface portion 610a, and a protrusion portion 635 which engages with the depression portion 618 of the projection portion 65c is provided in the lower portion thereof.

The right and left side surface portions 610c and 610d of the opening-closing lid 610 have shapes corresponding to the shapes of the right and left side surfaces of the upper cover 65. In other words, the right and left side surface portions 610c and 610d are configured to respectively have side surface walls 638a which are provided on front sides, and upper edges 638b which are connectively formed in upper portions of the side surface walls 638a to be extended to the rear sides. A portion which is connectively formed in the lower surface of the upper edge 638b from the lower surface of the side surface wall 638a via the rear surface has a shape corresponding to the shape of a portion from a side portion of the projection portion 65c of the upper cover 65 via a side portion of the front surface portion 65b to a front portion of the upper surface portion 65a.

Intake openings 641 for taking outside air into the outer case 62 are provided in each of side surface walls 638a of the right and left side surface portions 610c and 610d. An edge portion of the intake opening 641 on an inner side is formed to overlap with an outer edge of the projection portion 65c.

Figure 20:
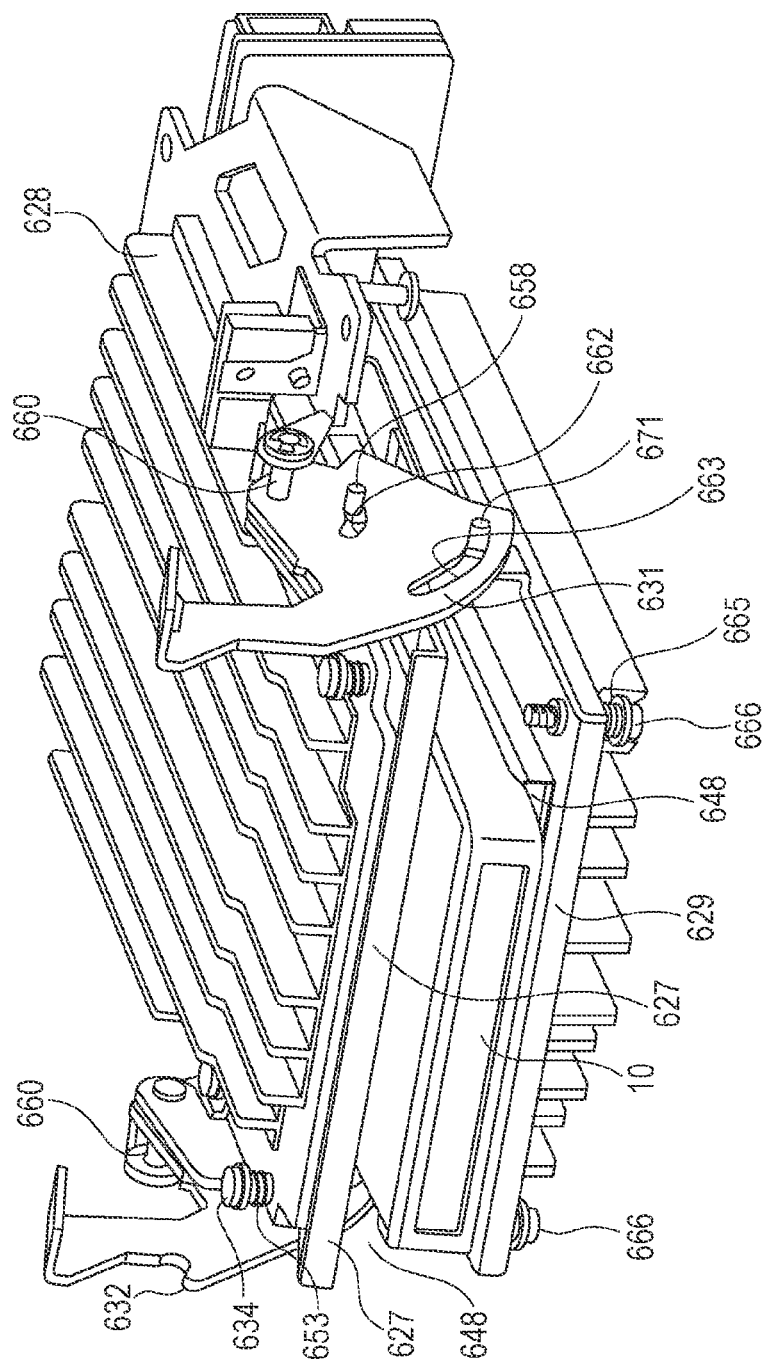
FIG. 20 is a perspective view exemplifying an appearance of a media holder.
Figure 21:
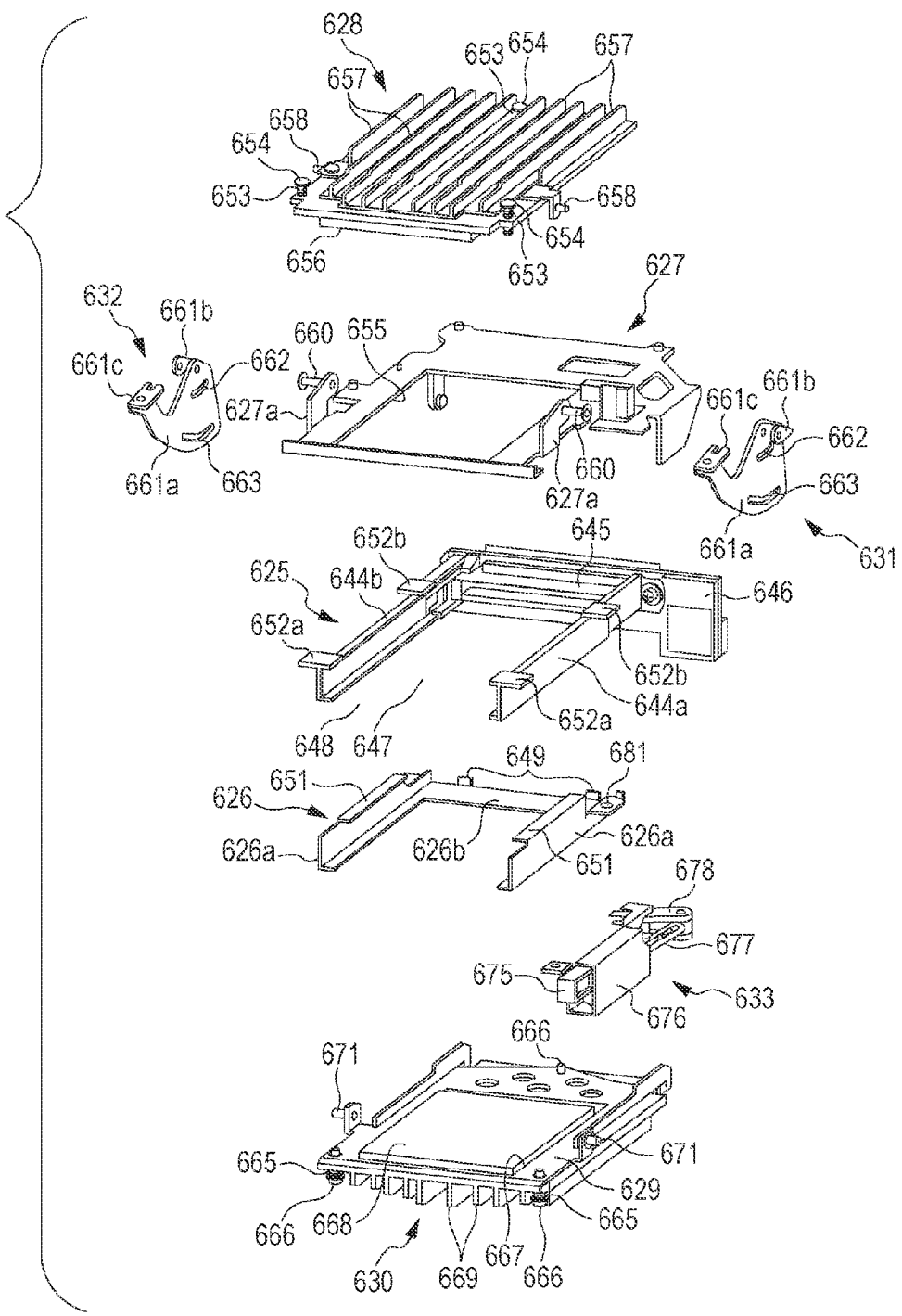
FIG. 21 is an exploded perspective view of the media holder.

As illustrated in FIGS. 20 and 21, the media holder 63 includes a guide rail 625, a slider 626, an upper base plate 627, an upper heat sink 628, a lower base plate 629, a lower heat sink 630, a right lid arm 631, a left lid arm 632, an eject link unit 633 and the like.

The guide rail 625 has a pair of rail members 644a and 644b which are installed to face each other at a predetermined interval in the transverse direction (width direction of adapter device), and a connector 645 which is arranged in the rail members 644a and 644b on rear surface sides. The connector 645 is mounted on a surface of a wiring substrate 646 for a connector, for example, and each end portion of the pair of rail members 644a and 644b is fixed to the wiring substrate 646.

The rail members 644a and 644b are formed to have a cross section in an angular U-shape, and the medium accommodation section 647 is formed in the inner side of the rail members 644a and 644b. An opposite side of the connector 645 in the medium accommodation section 647 is an insertion slot 648 through which the adapter device is taken in and out, and the adapter device inserted through the insertion slot 648 is guided by concave portions of the rail members 644a and 644b, thereby taking the medium accommodation section 647 in and out. The external connector 182 of the adapter device is electrically and mechanically connected to the connector 645 of the recording-reproducing apparatus 60 by thrusting the adapter device into the innermost portion of the medium accommodation section 647.

The slider 626 is arranged on the outer sides of the rail members 644a and 644b. The slider 626 slides into the insertion slot 648 side during an ejection operation to discharge the adapter device 10 by a predetermined distance. The slider 626 has a pair of frame pieces 626a which are installed to face each other at a predetermined interval, and a connection piece 626b which connects between both of the frame pieces 626a. A pressing piece 649 protruding to the medium accommodation section 647 side is provided in the connection piece 626b, and the pressing piece 649 presses the adapter device 10 to be pushed out to a predetermined position. A movement range setting portion 651 is provided in the pair of frame pieces 626a to move the slider 626 by a predetermined amount.

Regulation pieces 652a and 652b regulating an amount of the movement of the slider 626 are respectively provided in front and back of the pair of rail members 644a and 644b of the guide rail 625. The movement range setting portion 651 of the slider 626 is interposed between the regulation pieces 652a and 652b. Accordingly, the slider 626 is configured to be able to relatively move with respect to the guide rail 625 by an amount of a gap which is set between the movement range setting portion 651 and the regulation pieces 652a and 652b.

The upper base plate 627 is arranged on a surface (upper surface in the present embodiment) of the medium accommodation section 647 and formed with a plate-shaped member which can cover the entire upper surface of the medium accommodation section 647. The upper heat sink 628 is installed on the upper surface of the upper base plate 627. The upper heat sink 628 is urged by a clamping force of a plurality of fixing screws 654 mounted with a coil spring 653 and is elastically supported with respect to the upper base plate 627. A rectangular opening hole 655 which penetrates through front and rear surfaces thereof is provided in the upper base plate 627, and a heat reception portion 656 of the upper heat sink 628 fits the opening hole 655 leaving a predetermined gap therebetween.

The heat reception portion 656 of the upper heat sink 628 is formed to protrude further toward the outside than a surface of the upper base plate 627. Accordingly, when the upper heat sink 628 is pressed on one surface of the adapter device 10, a surface of the upper base plate 627 does not come into contact with a surface of the adapter device 10, and only the outer surface of the heat reception portion 656 is configured to come into contact with the surface of the adapter device 10. A plurality of radiation fins 657 extending in a plugging-unplugging direction of the adapter device 10 are provided on a side opposite to the heat reception portion 656 of the upper heat sink 628. Moreover, a pair of cam pins 658 extending in a direction orthogonal to the plugging-unplugging direction of the adapter device 10 are provided in a front side portion of the upper heat sink 628.

A pair of pivot axes 660 extending in a horizontal direction orthogonal to the plugging-unplugging direction of the adapter device 10 are provided in a front side portion of the upper base plate 627. The pair of pivot axes 660 are respectively erected in a pair of raised pieces 627a which are formed by raising side surface portions of the upper base plate 627. Each of the right and left lid arms 631 and 632 is individually supported to be rotatable in each of the pivot axes 660 provided in this pair of raised pieces 627a. The right and left lid arms 631 and 632 cause an opening-closing operation of the opening-closing lid 610 and an opening-closing operation of the media holder 63 to be synchronized. The right and left lid arms 631 and 632 to be both side portions of the upper base plate 627 are arranged in bilaterally symmetrical positions.

Each of the right lid arm 631 and the left lid arm 632 has a shape substantially similar to the other and has a fan-shaped portion 661a which is formed in a fan shape, an axis reception portion 661b which is formed in a main portion of the fan of the fan-shaped portion 661a, and a connection support portion 661c which is connectively formed on a side of a tip side of the fan-shaped portion 661a. The axis reception portions 661b is formed by bending a tip portion to provide two surfaces parallel to each other. This axis reception portion 661b is supported by the pivot axis 660 so that the right and left lid arms 631 and 632 are respectively attached to the upper base plate 627 to be rotatable. A difference between the right lid arm 631 and the left lid arm 632 is that protruding sides of the tip portions of the axis reception portions 661b are in directions opposite to each other, and the rest of the configuration is similar to that of each other lid arm including a shape and the like described below.

The connection support portions 661c of the right and left lid arms 631 and 632 are formed by bending the tip portion at 90 degrees. The connection support portions 661c abut an inner surface of the opening-closing lid 610, and the abutment portions are screwed by fixing screws to fix the opening-closing lid 610 to the right and left lid arms 631 and 632. The fan-shaped portion 661a in each of the lid arms 631 and 632 indicates a specific example of a cam plate. A first cam groove 662 and a second cam groove 663 are provided in each fan-shaped portion 661a of the lid arms 631 and 632. The first cam groove 662 and the second cam groove 663 have the pivot axis 660 as a center while having a curvature radius different from each other and extend in the circumferential direction.

The first cam grooves 662 of the right and left lid arms 631 and 632 allow the upper heat sink 628 to turn, and the pair of cam pins 658 provided in the upper heat sink 628 are respectively engaged with the first cam groove 662 to be slidable. The second cam groove 663 of the right and left lid arms 631 and 632 allows the lower heat sink 630 to turn, and a pair of cam pins 671 provided in the lower heat sink 630 are respectively engaged with the second cam groove 663 to be slidable.

The lower base plate 629 is arranged on the other surface (lower surface in the present embodiment) of the medium accommodation section 647 and formed with the plate-shaped member which can cover the entire lower surface of the medium accommodation section 647. The lower heat sink 630 is installed on the lower surface of the lower base plate 629. The lower heat sink 630 is urged by the clamping force of a plurality of fixing screws 666 mounted with a coil spring 665 and is elastically supported with respect to the lower base plate 629. A rectangular opening hole 667 which penetrates through front and rear surfaces thereof is provided in the lower base plate 629, and a heat reception portion 668 of the lower heat sink 630 fits the opening hole 667 leaving a predetermined gap therebetween.

The heat reception portion 668 of the lower heat sink 630 is formed to protrude further toward the outside than a surface of the lower base plate 629. Accordingly, when the lower heat sink 630 is pressed on the other surface of the adapter device 10, a surface of the lower base plate 629 does not come into contact with a surface of the adapter device 10, and only the outer surface of the heat reception portion 668 is configured to come into contact with the surface of the adapter device 10. Radiation fins 669 extending in the plugging-unplugging direction of the adapter device 10 are provided on a side opposite to the heat reception portion 668 of the lower heat sink 630. Moreover, a pair of cam pins 671 extending in a direction orthogonal to the plugging-unplugging direction of the adapter device 10 are provided in a front side portion of the lower heat sink 630. The pair of cam pins 671 respectively engage with the second cam grooves 663 provided in the right and left lid arms 631 and 632 to be slidable.

Figure 22:
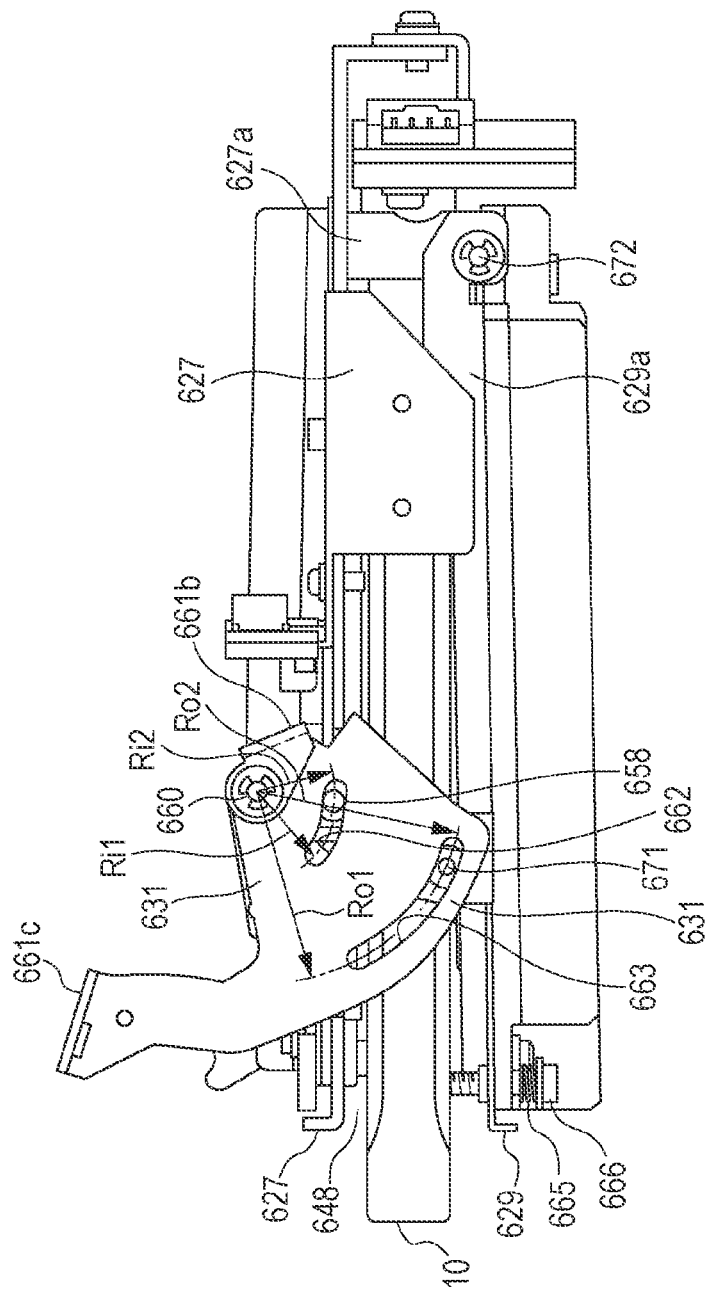
FIG. 22 is a view illustrating a state before upper and lower heat sinks are caused to be in press contact with the adapter device.
Figure 23:
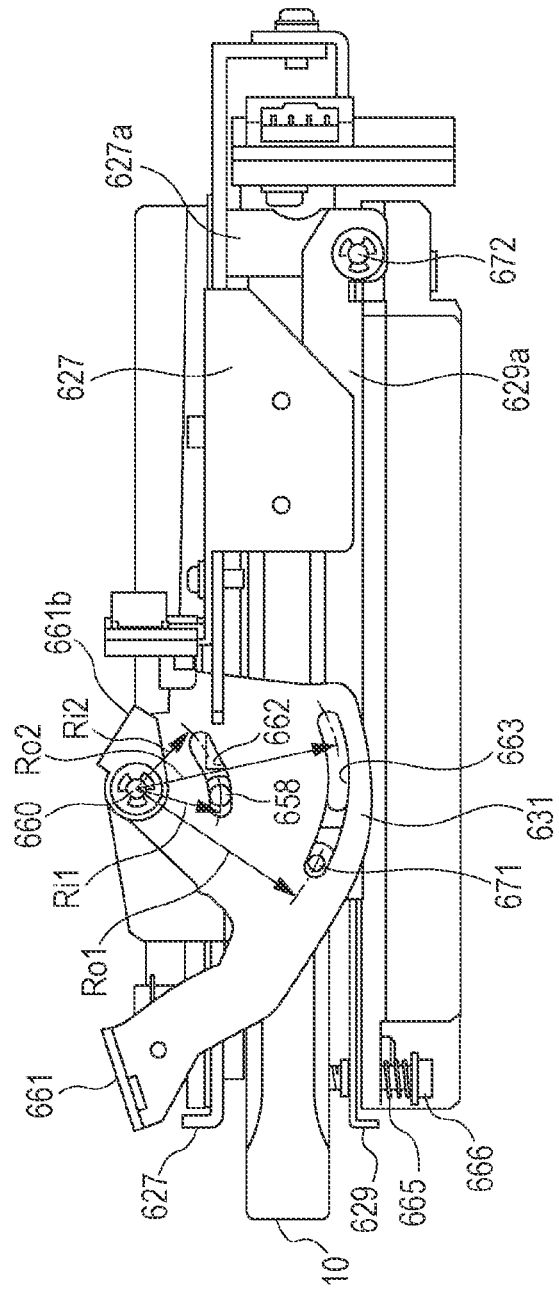
FIG. 23 is a view illustrating a state after the upper and lower heat sinks are caused to be in press contact with the adapter device.

As illustrated in FIGS. 22 and 23, the first cam groove 662 is formed as an arc-shaped long hole extending in the circumferential direction, and a length (curvature radius) Ri from the center of the pivot axis 660 to the center of the long hole continuously changes along the circumferential direction. In other words, a curvature radius Ri1 of an end portion on the connection support portion 661c side in the first cam groove 662 is set to be slightly greater than a curvature radius Ri2 of an end portion of the opposite side thereof (Ri1>Ri2). For this reason, if the right and left lid arms 631 and 632 turn, a length from an intermediate position between the first cam groove 662 and the second cam groove 663 to the first cam groove 662 changes, and thus, the upper heat sink 628 approaches and is separated with respect to the adapter device 10 in response to a turning amount thereof. According to the change (difference=Ri1−Ri2) of the curvature radius of this first cam groove 662, a posture change occurs in the upper heat sink 628, and thus, the insertion slot 648 side can make a greater movement than the opposite side thereof.

The second cam groove 663 is formed as the arc-shaped long hole extending in the circumferential direction, and the length (curvature radius) from the center of the pivot axis 660 to the center of the long hole continuously changes along the circumferential direction in the same manner mentioned. In other words, a curvature radius Ro1 of the end portion on the connection support portion 661c side in the second cam groove 663 is set to be slightly smaller than a curvature radius Ro2 of the end portion on the opposite side thereof (Ro1<Ro2). For this reason, if the right and left lid arms 631 and 632 turn, the length from the intermediate position between the first cam groove 662 and the second cam groove 663 to the second cam groove 663 changes, and thus, the lower heat sink 630 approaches and is separated with respect to the adapter device 10 in response to a turning amount thereof. According to the change (difference=Ro2−Ro1) of the curvature radius of this second cam groove 663, a posture change occurs in the lower heat sink 630, and thus, the insertion slot 648 side can make a greater movement than the opposite side thereof.

The upper base plate 627 and the lower base plate 629 are mutually connected to an end portion of a side opposite to the insertion slot 648 by a turning axis 672 to be able to turn. In other words, the raised pieces 627a protruding to the lower heat sink 630 side are respectively provided in both right and left side portions of the upper base plate 627. Axis reception pieces 629a formed to be bent on the upper heat sink 628 side are respectively provided in both the right and left side portions of a side opposite to the insertion slot 648 of the lower base plate 629. A tip portion of the raised piece 627a and a tip portion of the axis reception piece 629a are formed to overlap with each other in both the side portions of the upper base plate 627 and the lower base plate 629, and the turning axis 672 penetrates each of the overlapped portions. The upper base plate 627 and the lower base plate 629 are connected to each other to be able to turn via the pair of turning axes 672.

The eject link unit 633 discharges the adapter device 10 which is accommodated in the medium accommodation section 647. As illustrated in FIG. 21, the eject link unit 633 is configured to include an eject rod 675, a unit holder 676, a connection link 677, a turning link 678, a return spring (not illustrated), and the like. The eject rod 675 is supported by the unit holder 676 to be slidable in an axial direction, and a tip of the connection link 677 is connected to a rear end of the eject rod 675 in the axial direction to be able to turn. The turning link 678 is supported by a support axis 681 which is erected in the guide rail 625 to be able to turn. The support axis 681 penetrates an intermediate portion of the turning link 678 in the longitudinal direction, and a rear end of the connection link 677 is connected to a side thereof in the longitudinal direction to be able to turn.

In the recording-reproducing apparatus 60 having such a configuration, a posture of the upper heat sink 628 and the lower heat sink 630 changes by being synchronized with an opening-closing operation of the opening-closing lid 610.

When closing the opening-closing lid 610, the first cam groove 662 of the right and left lid arms 631 and 632 guides the cam pin 658 provided in the upper heat sink 628 to turn the upper heat sink 628 in a direction approaching the medium accommodation section 647 (downward). Then, the heat reception portion 656 of the upper heat sink 628 comes into press contact on the upper surface of the adapter device 10 which is accommodated in the medium accommodation section 647, by the spring force of the coil spring 653 mounted on the fixing screw 654. The second cam groove 663 of the right and left lid arms 631 and 632 guides the cam pin 671 provided in the lower heat sink 630 to turn the lower heat sink 630 in a direction approaching the medium accommodation section 647 (upward). Then, the heat reception portion 668 of the lower heat sink 630 comes into press contact on the lower surface of the adapter device 10 which is accommodated in the medium accommodation section 647, by the spring force of the coil spring 665 mounted on the fixing screw 666.

Meanwhile, when opening the opening-closing lid 610, the first cam groove 662 guides the cam pin 658 against the spring force of the coil spring 653 to turn the upper heat sink 628 in the direction away from the medium accommodation section 647 (upward). Accordingly, the heat reception portion 656 of the upper heat sink 628 is separated from the upper surface of the adapter device 10, and thus, a gap is formed between the heat reception portion 656 and the adapter device 10. The second cam groove 663 guides the cam pin 671 against the spring force of the coil spring 665 to turn the lower heat sink 630 in the direction away from the medium accommodation section 647 (downward). Accordingly, the heat reception portion 668 of the lower heat sink 630 is separated from the lower surface of the adapter device 10, and thus, a gap is formed between the heat reception portion 668 and the adapter device 10.

Therefore, when opening the opening-closing lid 610, the lid arms 631 and 632 turn such that the insertion slot side is greatly opened and the turning axis 672 side on the opposite side thereof is slightly opened in the medium accommodation section 647. For this reason, the heat reception portion 656 of the upper heat sink 628 is pushed and widened upward, and the heat reception portion 668 of the lower heat sink 630 is pushed and widened downward. Then, the adapter device 10 is inserted from the insertion slot into the medium accommodation section 647, and thus, the adapter device 10 can be inserted into the medium accommodation section 647 without coming into slide contact with the upper and lower heat reception portions 656 and 668. Since the insertion slot 612 side of the medium accommodation section 647 is opened to be greater than the turning axis 672 side, there is no possibility that the upper surface of the adapter device 10 is rubbed by the heat reception portion 656 of the upper heat sink 628, or that the lower surface thereof is rubbed by the heat reception portion 668 of the lower heat sink 630. Therefore, it is possible to prevent damage to the adapter device 10 due to the slide contact with the heat reception portions 656 and 668 by the surfaces of the adapter device 10.

When closing the opening-closing lid 610, the right and left lid arms 631 and 632 turn such that the cam pin 658 which is integrated with the upper heat sink 628 is guided by the first cam groove 662 to be pushed downward, and the heat reception portion 656 is pushed against the upper surface of the adapter device 10. In this case, the upper heat sink 628 is urged to the medium accommodation section 647 side by the coil spring 653, and thus, the outer surface of the heat reception portion 656 comes into press contact with the upper surface of the adapter device 10 by the spring force of the coil spring 653. The cam pin 671 which is integrated with the lower heat sink 630 is guided by the second cam groove 663 to be pushed upward, and the heat reception portion 668 is pushed against the lower surface of the adapter device 10. In this case, the lower heat sink 630 is urged to the medium accommodation section 647 side by the coil spring 665, and thus, the outer surface of the heat reception portion 668 comes into press contact with the lower surface of the adapter device 10 by the spring force of the coil spring 665. As described above, the cover of the adapter device 10 is in press contact with the media card. For this reason, heat generated in the media card can be efficiently and reliably radiated to the outside via the upper surface of the adapter device 10 through the upper heat sink 628, and heat can be efficiently and reliably radiated to the outside via the lower surface of the adapter device 10 through the lower heat sink 630.

When taking out the adapter device 10 accommodated in the medium accommodation section 647, the eject rod 675 of the eject link unit 633 is pressed. If the eject rod 675 is pressed, the force thereof is transmitted to the turning link 678 via the connection link 677, and the pressing piece 649 provided in the slider 626 presses the adapter device 10 to the front, thereby pushing out the adapter device 10 to a predetermined position. As a result, a portion of the adapter device 10 protrudes from the insertion slot so that the adapter device 10 is in a state to be able to be grasped. Then, a protruded portion of the adapter device 10 is grasped to be pulled out, and thus, it is possible to take out the adapter device 10 from the recording-reproducing apparatus 60.

The recording-reproducing apparatus 60 drives the exhaust fan 624 to allow outside air to pass through the inside of the outer case 62, and thus, it is possible to forcibly cool the adapter device 10 or the upper heat sink 628 and the lower heat sink 630. The recording-reproducing apparatus may be configured to have only an upper heat sink or may be configured to have only a lower heat sink, without being limited to the above-described configuration. Although the radiation fins are formed in a straight line shape in the upper and lower heat sinks, the radiation fins can be formed in a curved line shape or a zigzag shape.

5. Another Electronic Apparatus Using Adapter Device

Figure 24:
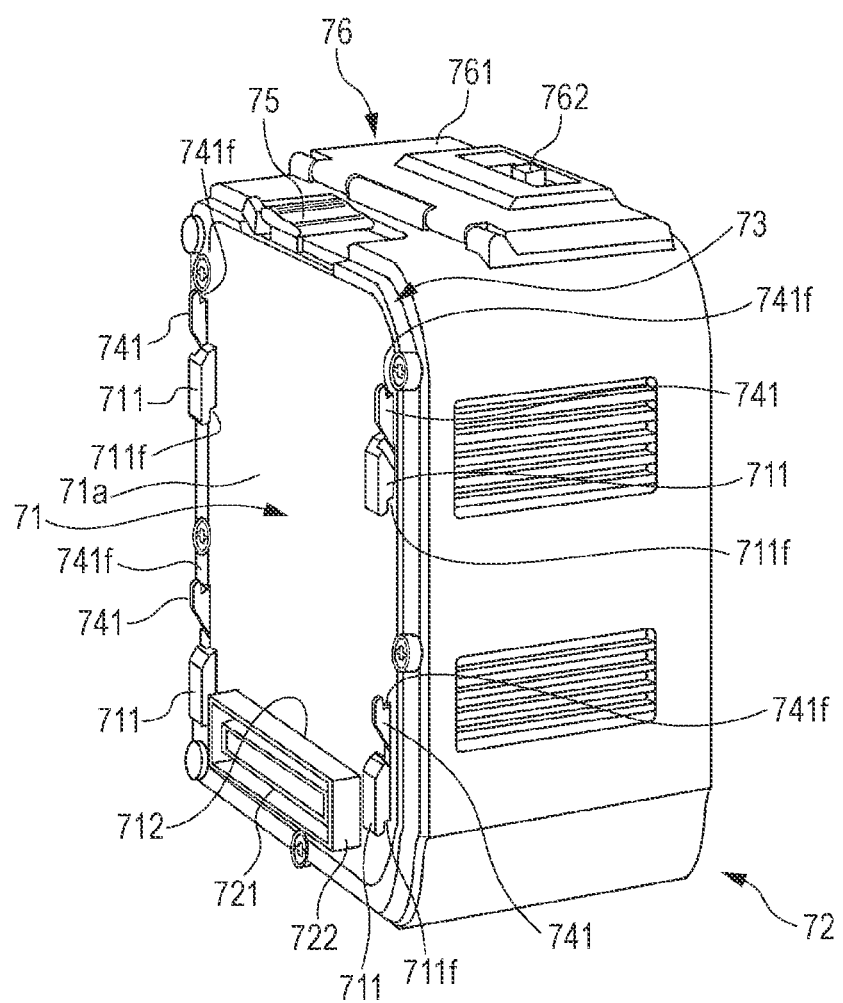
FIG. 24 is a perspective view exemplifying an appearance of another recording-reproducing apparatus using the adapter device.

FIG. 24 is a perspective view exemplifying an appearance of another electronic apparatus, for example, a recording-reproducing apparatus which is detachably attached to a rear surface side of a camera main body unit of a video camera for professional purposes, using the adapter device.

A recording-reproducing apparatus 70 includes an attachment base 71, a housing 72, and a cover portion 73 which covers an opening portion on a camera main body side when the attachment base 71 is attached to the housing 72.

The attachment base 71 has an engagement portion 711 which engages with the camera main body, on an attachment surface 71a facing an attachment surface on the camera main body side. The engagement portion 711 has a hook portion 711f which engages with an engagement concave portion provided in the camera main body unit and which is provided to protrude forward from the attachment surface 71a at a predetermined interval in both upper and lower side end portions of the attachment base 71, for example. The attachment base 71 is provided with an insertion hole 712 through which a connector insertion guide 722 is inserted provided in the housing 72.

The housing 72 is provided with a connector 721, and a frame-shaped connector insertion guide 722 which protrudes further in a connector insertion direction than the connector 721 having the position of the connector 721 as a standard. The cover portion 73 is fixed to the housing 72 by using a screw and the like. Moreover, the attachment base 71 allows the connector insertion guide 722 to be inserted through the insertion hole 712 of the attachment base 71 by the housing 72 and the cover portion 73, thereby being held to be movable in the inserting-withdrawing direction of the connector. Moreover, a movement direction conversion section which converts a movement in an operation direction applied to an operation lever 75 into a movement in the inserting-withdrawing direction of the connector of the housing 72 with respect to the attachment base 71 is accommodated in the housing 72. The housing 72 is provided with a connection cable, a connection substrate, connector and the like for connecting a media card, an adapter device or the like which are provided to be able to be inserted into and withdrawn from a terminal of the connector 721 and the housing 72.

Inside the housing 72, there is provided a slider (not illustrated) which converts a movement in the operation direction applied to the operation lever 75 into a movement in the inserting-withdrawing direction of the connector of the housing 72 with respect to the attachment base 71. An engagement portion 741 which engages with the camera main body unit is formed in the slider. The engagement portion 741 has a hook portion 741f which engages with the engagement concave portion provided in the camera main body unit and which is provided to protrude forward at a predetermined interval in both upper and lower side end portions of the slider.

The slider causes the housing 72 to move in the insertion direction of the connector with respect to the attachment base 71 when operating the operation lever 75 to be parallel to the attachment surface 71a of the attachment base 71 from an erected state to a laid state, for example. The slider also causes the engagement portion 741 to protrude further than the attachment surface 71a, thereby moving the hook portion 741f of the engagement portion 741 in a direction away from the hook portion 711f of the engagement portion 711. Therefore, the connector 721 of the recording-reproducing apparatus can be connected to the connector of the camera main body unit. The hook portion 711f of the engagement portion 711 and the hook portion 741f of the engagement portion 741 move in the direction to be away from each other and respectively engage with the engagement concave portions provided in the camera main body unit, and thus, the recording-reproducing apparatus is fixed to the camera main body unit.

The slider moves the housing 72 in the withdrawal direction of the connector with respect to the attachment base 71 when operating the operation lever 75 from the laid state to the erected state, for example. The slider also moves the hook portion 741f of the engagement portion 741 in a direction approaching the hook portion 711f of the engagement portion 711. Moreover, the slider accommodates the engagement portion 741 so as not to cause the engagement portion 741 to protrude from the attachment surface 71a. Therefore, connection between the connector 721 of the recording-reproducing apparatus and the connector of the camera main body unit can be released. Since the hook portion 711f of the engagement portion 711 and the hook portion 741f of the engagement portion 741 move to approach each other, an engagement state with respect to the engagement concave portion provided in the camera main body unit is released, and thus, it is possible to separate the recording-reproducing apparatus from the camera main body unit.

A recording medium insertion portion 76 is provided on an upper surface of the housing 72. The recording medium insertion portion 76 is provided with an insertion slot (not illustrated), and an insertion slot opening-closing lid 761 which covers an insertion slot. The insertion slot opening-closing lid 761 is provided with an operation lever 762, thereby it is possible to fix the insertion slot opening-closing lid 761 to be in a closed state by using the operation lever 762, for example. When using a media card or a media card having a different physical specification via the adapter device 10, the insertion slot opening-closing lid 761 is caused to be in the open state, thereby inserting the media card or the adapter device into the insertion slot. The insertion slot opening-closing lid 761 is also caused to be in the closed state, thereby performing recording or reproducing of a signal using a media card or a media card which is inserted into the adapter device.

Figure 25:
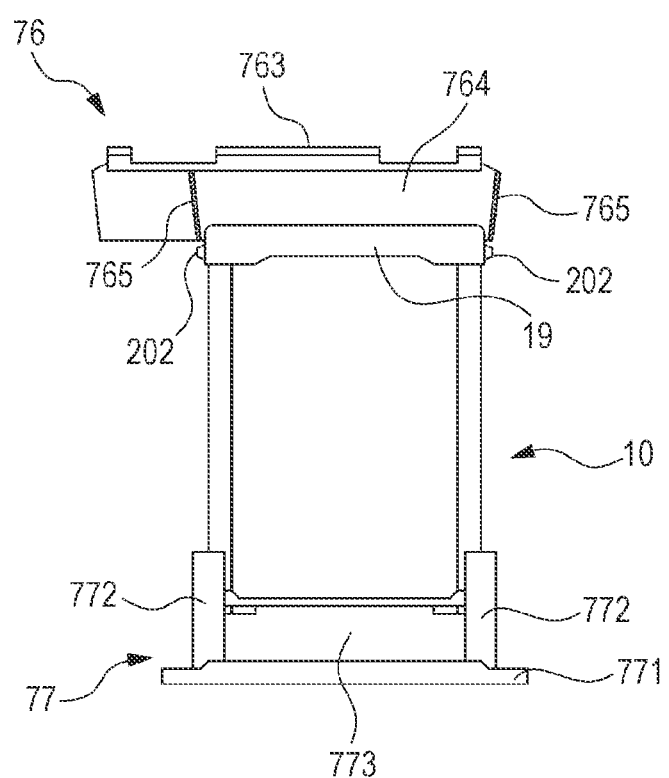
FIG. 25 is a view illustrating the adapter device, a recording medium insertion portion of the recording-reproducing apparatus, and a connector.

FIG. 25 illustrates a recording medium insertion portion and a connector of the adapter device and the recording-reproducing apparatus. The recording medium insertion portion 76 is provided with an insertion slot 764 in a recording medium insertion base 763. For example, both sides of the adapter device 10 inserted from the insertion slot 764 are respectively provided with engagement portions 765 which engage with the engagement convex portions 202 of the adapter device 10 so as not to allow the inserted adapter device 10 to be easily withdrawn. FIG. 25 illustrates a case of utilizing a side wall of the insertion slot 764 as the engagement portion 765 so that the engagement convex portion 202 engages with an end portion of the side wall.

A card reception portion 77 is provided with a pair of guides 772 and a connector 773 in a connector base 771. The pair of guides 772 regulate a position of the adapter device 10 so as to cause the external connector 182 of the inserted adapter device 10 to correctly come into contact with the connector 773 of the card reception portion 77.

FIGS. 26A to 26D illustrate schematized operations of insertion and withdrawal of the adapter device. The adapter holding portions 20R and 20L of the adapter device 10 are urged to cause the engagement convex portion 202 to protrude further toward the outside than the side surface of the sub-frame 19 by the coil springs 21R and 21L. Therefore, when the adapter device 10 is inserted from the recording medium insertion portion, as illustrated in FIG. 26A, if the adapter device 10 moves to an arrow MA direction, an inclined surface of the engagement convex portion 202 slides on the engagement portions 765. Therefore, the movable body 201 moves against the spring force of the coil springs 21R and 21L in an arrow MB direction which is a direction opposite to the direction of the urging force.

If the adapter device 10 is inserted into a predetermined position to be electrically and physically connected to the recording-reproducing apparatus 70, the engagement convex portion 202 passes through positions of the engagement portions 765 to return to a position protruding further toward the outside than the side surface of the sub-frame 19, as illustrated in FIG. 26B, thereby being in a state of engaging with the engagement portions 765.

Here, an evulsion force when taking out the adapter device 10 from the recording-reproducing apparatus 70 is referred to as an adapter evulsion force. In other words, a force which causes the inclined surface of the engagement convex portion 202 to slide on the engagement portions 765 and causes the movable body 201 to move against the spring force of the coil springs 21R and 21L in a direction opposite to the direction of the urging force is referred to as the adapter evulsion force. An evulsion force when taking out the media card 40 from the adapter device 10 is referred to as a card evulsion force.

In the adapter device 10, a shape of the engagement convex portion 202 or the engagement portions 765 and a spring force of the coil springs 21R and 21L are set to cause the adapter evulsion force to be greater than the card evulsion force. If the evulsion forces are set in such a manner, as illustrated in FIG. 26C, even if a force is applied to the media card 40 in the withdrawal direction (arrow MC direction), the adapter device 10 maintains a state of being mounted on the recording-reproducing apparatus 70, and thus, it is possible to take out only the media card 40.

When taking out the adapter device 10 from the recording-reproducing apparatus 70, a force greater than the adapter evulsion force is applied to the adapter device 10 in the withdrawal direction (arrow MC direction) as illustrated in FIG. 26D. If such a force is applied thereto, the inclined surface of the engagement convex portion 202 slides on the engagement portion 765, and the movable body 201 moves against the spring force of the coil springs 21R and 21L in the arrow MB direction which is a direction opposite to the direction of the urging force. Therefore, the engaged state between the engagement convex portion 202 and the engagement portion 765 is released, and thus, it is possible to take out the adapter device 10 from the recording-reproducing apparatus 70.

In the recording-reproducing apparatus 60 described above, a configuration is exemplified in which the upper heat sink 628 and the lower heat sink 630 are in press contact with the adapter device 10 by utilizing a closing operation of the opening-closing lid 610. However, in the recording-reproducing apparatus 70, the heat sink may be in press contact with the adapter device by utilizing the operation of the operation lever 75. In other words, if the operation lever 75 is operated from the erected state to the laid state, the housing 72 moves in a direction toward the attachment base 71, and thus, the heat sink may be in press contact with the adapter device 10 by utilizing the movement of the housing 72.

Moreover, in the recording-reproducing apparatus described above, a case is exemplified in which the heat sink is in press contact with the media card or the adapter apparatus to radiate heat generated in the media card or the adapter device from the heat sink to the outside, and a radiation mechanism is not limited to the above-described configuration. For example, since the media card is in press contact with the cover of the adapter device, the heat sink may be arranged to be fixed to a position close to snow. In this case, heat conductivity is degraded compared to a state where the heat sink is in press contact with the media card or the adapter device. Therefore, the heat sink is to be configured to be fixed to and arranged in a close position where a temperature of the media card inserted into the recording-reproducing apparatus or the media card inserted into the adapter device can be suppressed to be equal to or lower than a desired temperature (for example, operation guarantee temperature), even if the heat conductivity is degraded.

The present technology is not to be construed as being limited to the embodiments of the technology described above. In the embodiments of this technology, the present technology is disclosed in forms of exemplifications, those who skilled in the art can surely make a modification or a substitution of the embodiments without departing from the scope of the present technology. In other words, in order to determine the scope of the present technology, it is desirable to be referred to "What Is Claimed Is". Furthermore, the above-described effect is merely an exemplification, and thus, an effect of the present technology is not limited to the effect described above.

The adapter device according to the present technology may have configurations described below.

(1) An adapter device includes a cover that covers an inserted recording medium, a cover urging portion that urges the cover in a direction of the recording medium and causes the cover to be in press contact with the recording medium, and a connector conversion section that connects a terminal portion of the recording medium to a connector on an apparatus side having a different physical specification.

(2) The adapter device according to (1) in which the cover includes a first cover which covers one surface of the recording medium and a second cover which covers the other surface of the recording medium opposing the one surface, and the cover urging portion urges the first cover and the second cover in a direction to pinch the recording medium which is inserted between the covers.

(3) The adapter device according to (1) or (2) includes an insertion guide that is provided in a recording medium insertion side end portion of the cover, and of which a cover surface protrudes in a direction opposite to the recording medium side.

(4) The adapter device according to any one of (1) to (3) in which the connector conversion section is provided to be movable in a direction vertical to front and rear surfaces of the recording medium.

(5) The adapter device according to any one of (1) to (4) includes a sheet-shaped protection member that is provided on a surface of the cover on the recording medium side.

(6) The adapter device according to any one of (2) to (5) in which positions of the first cover and the second cover are switched with respect to an insertion position of the recording medium in an installation position of the cover urging portion, and the cover urging portion urges the first cover and the second cover in a direction of the recording medium by urging the first cover and the second cover to widen the gap therebetween.

(7) The adapter device according to any one of (1) to (6) includes a regulation portion that regulates a movement of the cover in a direction opposite to an urging direction within a predetermined amount.

(8) The adapter device according to (7) in which the regulation portion is formed in the cover urging portion.

(9) The adapter device according to any one of (1) to (8) includes an engagement portion that is urged to protrude from a side end of the adapter device.

It should be understood by those skilled in the art that various modifications, combinations, sub-combinations and alterations may occur depending on design requirements and other factors insofar as they are within the scope of the appended claims or the equivalents thereof.

What is claimed is:

1. An adapter device comprising:
   a cover that covers an inserted recording medium;
   a cover urging portion that urges the cover in a direction of the recording medium and causes the cover to be in press contact with the recording medium; and
   a connector conversion section that connects a terminal portion of the recording medium to a connector on an apparatus side having a different physical specification than the terminal portion of the recording medium.

2. The adapter device according to claim 1,
   wherein the cover includes a first cover which covers one surface of the recording medium and a second cover which covers the other surface of the recording medium opposing the one surface, and
   wherein the cover urging portion urges the first cover and the second cover in a direction to pinch the recording medium which is inserted between the first and second covers.

3. The adapter device according to claim 1, further comprising:
   an insertion guide that is provided in a recording medium insertion side end portion of the cover, and of which a cover surface protrudes in a direction opposite to the recording medium insertion side end portion of the cover.

4. The adapter device according to claim 1,
   wherein the connector conversion section is provided to be movable in a direction vertical to front and rear surfaces of the recording medium.

5. The adapter device according to claim 1, further comprising:
   a sheet-shaped protection member that is provided on a surface of the cover on a recording medium side of the cover.

6. The adapter device according to claim 1,
   wherein the cover includes a first cover which covers one surface of the recording medium and a second cover which covers the other surface of the recording medium opposing the one surface,
   wherein positions of the first cover and the second cover are switched with respect to an insertion position of the recording medium in an installation position of the cover urging portion, and
   wherein the cover urging portion urges the first cover and the second cover in a direction of the recording medium by urging the first cover and the second cover to widen the gap therebetween.

7. The adapter device according to claim 1, further comprising:
   a regulation portion that regulates a movement of the cover in a direction opposite to an urging direction within a predetermined amount.

8. The adapter device according to claim 7,
   wherein the regulation portion is formed in the cover urging portion.

9. The adapter device according to claim 1, further comprising:
   an engagement portion that is urged to protrude from a side end of the adapter device.

10. The adapter device according to claim 1,
    wherein an evulsion force during a withdrawal of the adapter device from an electronic apparatus against an urging force of an engagement portion is caused to be greater than the evulsion force during a withdrawal of the inserted recording medium.

11. An electronic apparatus comprising:
    an adapter unit; and
    a heat sink that radiates heat generated in the adapter unit to the outside,
    wherein the adapter unit has a cover that covers an inserted recording medium, a cover urging portion that urges the cover in a direction of the recording medium and causes the cover to be in press contact with the recording medium, and a connector conversion section that connects a terminal portion of the recording medium to a connector on an apparatus side having a different physical specification than the terminal portion of the recording medium.

* * * * *